(12) United States Patent
Miyasako

(10) Patent No.: US 8,508,599 B2
(45) Date of Patent: Aug. 13, 2013

(54) MOTION VECTOR DETECTION APPARATUS, MOTION VECTOR DETECTION METHOD, AND IMAGE CAPTURING APPARATUS

(75) Inventor: Kenichi Miyasako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 12/762,888

(22) Filed: Apr. 19, 2010

(65) Prior Publication Data
US 2010/0271494 A1      Oct. 28, 2010

(30) Foreign Application Priority Data

Apr. 23, 2009   (JP) .................................. 2009-105608

(51) Int. Cl.
*H04N 5/228*      (2006.01)
*G06K 9/00*       (2006.01)

(52) U.S. Cl.
USPC ....................... 348/208.1; 348/208.4; 382/107

(58) Field of Classification Search
None
See application file for complete search history.

(56) References Cited

U.S. PATENT DOCUMENTS

| | | | |
|---|---|---|---|
| 5,237,405 A | | 8/1993 | Egusa et al. |
| 7,595,818 B2 * | | 9/2009 | Shimizu .................... 348/208.99 |
| 8,111,877 B2 * | | 2/2012 | Watanabe ...................... 382/107 |
| 2007/0092009 A1 * | | 4/2007 | Muraki .................... 375/240.16 |
| 2009/0135261 A1 * | | 5/2009 | Imamura et al. ......... 348/208.99 |
| 2009/0225227 A1 * | | 9/2009 | Nozawa et al. ............... 348/699 |

FOREIGN PATENT DOCUMENTS

| | | |
|---|---|---|
| JP | 04-180370 | 6/1992 |
| JP | 2002-251380 | 9/2002 |

OTHER PUBLICATIONS

Morio Onoe, et al. "Information Processing" vol. 17 No. 7, p. 634-640, Jul. 1976, (English Translation of "Image Registration by the sequential Similarity Detection algorithm".

* cited by examiner

*Primary Examiner* — Luong T Nguyen
(74) *Attorney, Agent, or Firm* — Cowan, Liebowitz & Latman, P.C.

(57) ABSTRACT

A frame is divided into blocks each having a predetermined size, and motion vectors are calculated for respective blocks. The blocks are classified into an object group including an object image and a background group as a background image based on the calculated motion vectors, and representative motion vectors of the respective groups are calculated. The number of blocks included in the object group is compared with a threshold. When the number of blocks is larger than the threshold, the representative motion vector of the object group is selected as a motion vector for the entire frame. On the other hand, when the number of blocks included in the object group is smaller than the threshold, the representative motion vector of the background group is selected as the motion vector for the entire frame.

22 Claims, 19 Drawing Sheets

BLOCK (VECTOR DETECTION REGION)

BLOCK

MOTION VECTOR

FIG. 8A

| (X0,Y0) • | (X1,Y0) • | (X2,Y0) • | (X3,Y0) • | (X4,Y0) • | (X5,Y0) • | (X6,Y0) • | (X7,Y0) • |
|---|---|---|---|---|---|---|---|
| (X0,Y1) • | (X1,Y1) • | (X2,Y1) • | (X3,Y1) • | (X4,Y1) • | (X5,Y1) • | (X6,Y1) • | (X7,Y1) • |
| (X0,Y2) • | (X1,Y2) • | (X2,Y2) • | (X3,Y2) • | (X4,Y2) • | (X5,Y2) • | (X6,Y2) • | (X7,Y2) • |
| (X0,Y3) • | (X1,Y3) • | (X2,Y3) • | (X3,Y3) • | (X4,Y3) • | (X5,Y3) • | (X6,Y3) • | (X7,Y3) • |
| (X0,Y4) • | (X1,Y4) • | (X2,Y4) • | (X3,Y4) • | (X4,Y4) • | (X5,Y4) • | (X6,Y4) • | (X7,Y4) • |

| (X0,Y0) • | (X1,Y0) • | (X2,Y0) • | (X3,Y0) • | (X4,Y0) • | (X5,Y0) • | (X6,Y0) • | (X7,Y0) • |
|---|---|---|---|---|---|---|---|
| (X0,Y1) • | (X1,Y1) • | (X2,Y1) • | (X3,Y1) • | (X4,Y1) • | (X5,Y1) • | (X6,Y1) • | (X7,Y1) • |
| (X0,Y2) • | (X1,Y2) • | (X2,Y2) • | (X3,Y2) • | (X4,Y2) • | (X5,Y2) • | (X6,Y2) • | (X7,Y2) • |
| (X0,Y3) • | (X1,Y3) • | (X2,Y3) • | (X3,Y3) • | (X4,Y3) • | (X5,Y3) • | (X6,Y3) • | (X7,Y3) • |
| (X0,Y4) • | (X1,Y4) • | (X2,Y4) • | (X3,Y4) • | (X4,Y4) • | (X5,Y4) • | (X6,Y4) • | (X7,Y4) • |

GROUP #1          GROUP #2

GROUP #11   GROUP #12

GROUP #21   GROUP #22

GROUP #31   GROUP #32

MOTION VECTOR DETECTION APPARATUS, MOTION VECTOR DETECTION METHOD, AND IMAGE CAPTURING APPARATUS

BACKGROUND OF THE INVENTION

1. Field of the Invention

The present invention relates to a motion vector detection apparatus, a motion vector detection method, and image capturing apparatus and, more particularly, to a motion vector detection apparatus which detects a motion vector used to correct any blur in a captured motion image, a motion vector detection method, and an image capturing apparatus.

2. Description of the Related Art

In an image capturing apparatus such as a video camera, which captures a motion image, especially when a lens is zoomed to the telephoto-side, a captured image often blurs due to a camera shake, thus posing a problem. In order to prevent any blur in an image due to a camera shake, a conventional technique which detects a motion vector of an image from a captured image signal, and corrects a blur in the image based on this motion vector has been proposed.

As a method of detecting a motion vector of an image, a correlation method, block matching method, and the like based on correlation calculations are conventionally known. In a block matching method, an image is divided into blocks each having a predetermined size (for example, 8 pixels×8 pixels). Differences from pixels within a predetermined range on a previous field (or frame) are calculated for each block, and a block of the previous field (frame) having a smallest sum of the absolute values of these differences is searched for. Then, a relative deviation between the current field (or frame) and the previous field (or frame) indicates a motion vector of the found block.

Matching calculations have been discussed in detail in Morio Onoe, et. al. "Information Processing Vol. 17, No. 7, p. 634-640 July 1976".

An example of the conventional motion vector detection method using the block matching method will be described below with reference to the drawings. FIG. 19 shows an example of the arrangement for preventing any blur by the conventional motion vector detection method. An image signal (field image signal) as an object from which a motion vector is to be detected is supplied to an image memory 101 and is temporarily stored in the image memory 101. The image signal is also supplied to a filter 102 which extracts spatial frequency components. The filter 102 extracts spatial frequency components useful for motion vector detection from the image signal. That is, the filter 102 removes low- and high-frequency components of the spatial frequency components of the image signal.

The image signal filtered through the filter 102 is supplied to a binarization circuit 103. The binarization circuit 103 binarizes the image signal with reference to zero level. More specifically, the binarization circuit 103 outputs sign bits of output signals. The binarized image signal is supplied to a correlation calculation circuit 104 and memory 105. The memory 105 is used to delay the image signal by one field period. The image signal one field before read out from the memory 105 is supplied to the correlation calculation circuit 104.

The correlation calculation circuit 104 divides an image region of the image signal into blocks each having a predetermined size and makes correlation calculations between the current and previous fields for respective blocks according to the block matching method. Correlation values for respective blocks calculated by the correlation calculations are supplied to a motion vector detection circuit 106. The motion vector detection circuit 106 detects motion vectors for respective blocks from the supplied correlation values. More specifically, the motion vector detection circuit 106 searches for a block of the previous field having a smallest correlation value to detect that relative deviation as a motion vector.

Motion vectors for respective blocks are supplied to a motion vector decision circuit 107. The motion vector decision circuit 107 decides a motion vector for the entire field image from the motion vectors for respective blocks. More specifically, the motion vector decision circuit 107 decides a median value or average value of the motion vectors for respective blocks as the motion vector of the entire field image.

The motion vector decision circuit 107 supplies the decided entire motion vector to a memory read control circuit 108. The memory read control circuit 108 reads out the field image signal stored in the image memory 101 and outputs the readout field image signal. At this time, the memory read control circuit 108 controls the read position of the image memory 101 so as to cancel motion in an image according to the entire motion vector decided by the motion vector decision circuit 107. In this manner, the image signal in which blur is corrected is output from the image memory 101.

In the aforementioned conventional method, when an image includes a moving object, and an average value of the motion vectors detected for respective blocks is decided as the entire motion vector, the motion of the moving object in the image mixes in the entire motion vector. As a result, the read position of the image memory 101 changes so as to hold the moving object at an original position within the frame under the control of the memory read control circuit 108. Since the position of a region in the frame, which is originally free from any motion, changes, an image in the frame moves as if it were pulled by the moving object.

In order to solve this problem, Japanese Patent Laid-Open No. 04-180370 discloses a technique which sets weighting coefficients for respective block regions, and calculates a motion vector for the entire frame based on the weighting coefficients and vector detection values of the respective block regions. According to Japanese Patent Laid-Open No. 04-180370, small weighting coefficients are set for the center of the frame since a moving object such as a person is more likely to exist there, and large weighting coefficients are set for the surrounding portion of the frame, thus avoiding motion as if an image in the frame were pulled by the moving object.

According to the aforementioned method of Japanese Patent Laid-Open No. 04-180370, when the occupation ratio of a principal object 200 (person) in the frame is relatively small, as shown in, for example, FIG. 20A, a motion vector approximate to a blur in a background region can be calculated by setting large weighting coefficients of the background region in the surrounding portion of the frame. However, when occupation ratio of the object 200 in the frame is relatively large, as shown in FIG. 20B, since both the object 200 and background exist on the region of the surrounding portion of the frame, errors of the motion vector detection values become larger.

SUMMARY OF THE INVENTION

The present invention provides a motion vector detection apparatus which can calculate a motion vector used to correct any blur in a captured image with high precision irrespective of the state of a principal object in a frame, a motion vector detection method, and an image capturing apparatus.

According to an aspect of the present invention, there is provided a motion vector detection apparatus for detecting a motion vector for an entire image, comprising: a motion vector detection unit configured to detect motion vectors for respective blocks obtained by dividing an image into the blocks each having a predetermined size; a classifying unit configured to classify the respective blocks into groups based on the motion vectors detected by the motion vector detection unit; a representative motion vector calculation unit configured to calculate representative motion vectors which represent the motion vectors of the blocks that belong to the groups classified by the classifying unit; a first determination unit configured to determine whether each of the groups classified by the classifying unit corresponds to a first group or a second group which moves relative to the first group; and a selection unit configured to, when the number of blocks included in the group determined as the second group by the first determination unit exceeds a threshold, select the representative motion vector corresponding to the second group as the motion vector for the entire image, and to, when the number of blocks included in the second group does not exceed the threshold, select the representative motion vector corresponding to the first group as the motion vector for the entire image.

According to another aspect of the present invention, there is provided a motion vector detection method for detecting a motion vector for an entire image, which is used to correct any blur in images to be continuously captured, comprising: a motion vector detection step of detecting motion vectors for respective blocks obtained by dividing an image into the blocks each having a predetermined size; a classifying step of classifying the respective blocks into groups based on the motion vectors detected in the motion vector detection step; a representative motion vector calculation step of calculating representative motion vectors which represent the motion vectors of the blocks that belong to the groups classified in the classifying step; a first determination step of determining whether each of the groups classified in the classifying step corresponds to a first group or a second group which moves relative to the first group; and a selection step of selecting, when the number of blocks included in the group determined as the second group in the first determination step exceeds a threshold, the representative motion vector corresponding to the second group as the motion vector for the entire image, and selecting, when the number of blocks included in the second group does not exceed the threshold, the representative motion vector corresponding to the first group as the motion vector for the entire image.

According to further aspect of the present invention, there is provided an image capturing apparatus comprising: an image capturing optical system; an image capturing unit configured to capture incoming light via the image capturing optical system and outputting the captured light as a captured image signal; a signal processing unit configured to apply predetermined signal processing to the captured image signal and output the processed signal as a captured image; a motion vector detection apparatus of the present invention which calculates a motion vector for an entire image of the captured image based on the captured image output from the signal processing unit; and a blur correction unit configured to correct a blur in the captured image output from the signal processing unit using the motion vector for the entire image calculated by the motion vector detection apparatus.

According to yet further aspect of the present invention, there is provided a computer-readable recording medium storing a program for making a computer function as respective unit of a motion vector detection apparatus of the present invention.

Further features of the present invention will become apparent from the following description of exemplary embodiments with reference to the attached drawings.

BRIEF DESCRIPTION OF THE DRAWINGS

FIGS. 8A and 8B are views for explaining the determination processing of vectors detected by the motion vector classifying unit by a first determination method;

DESCRIPTION OF THE EMBODIMENTS

Exemplary embodiments of the present invention will now be described in detail in accordance with the accompanying drawings.

First Embodiment

Figure 1:
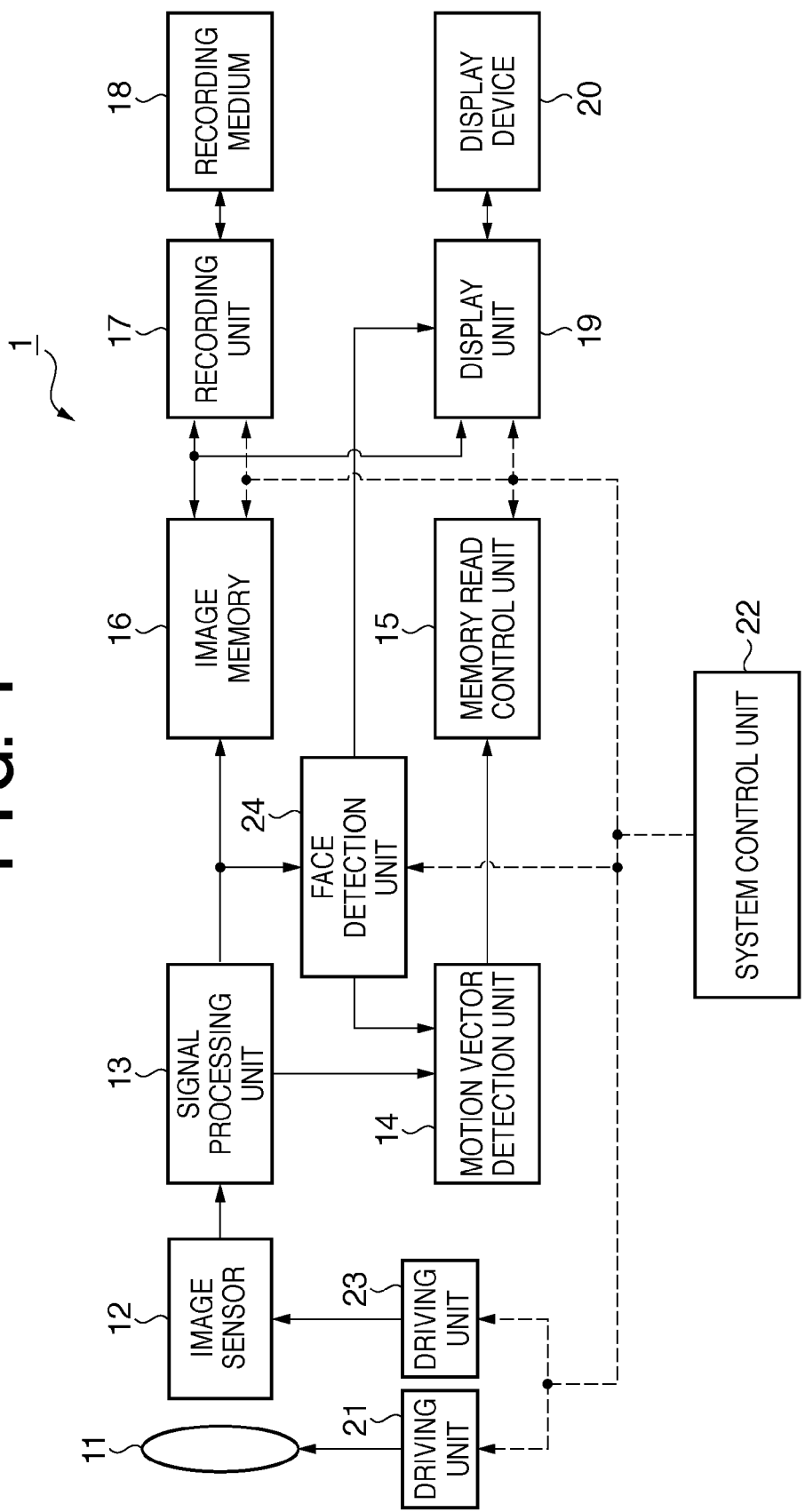
FIG. 1 is a block diagram showing an example of the arrangement of an image capturing apparatus which is applicable to the present invention.

The first embodiment of the present invention will be described hereinafter with reference to the drawings. FIG. 1 shows an example of the arrangement of an image capturing apparatus 1 which is applicable to the present invention. The image capturing apparatus 1 is, for example, a digital video camera which captures a motion image as an example of captured images to be continuously captured.

Referring to FIG. 1, an image capturing optical system 11 includes lenses and a stop. A solid-state image sensor 12 is, for example, a CCD or CMOS sensor. The solid-state image sensor 12 converts incoming light via the image capturing optical system 11 into a captured image signal, and outputs the captured image signal. A driving unit 21 drives a zoom lens, focus lens, stop, and the like (not shown) included in the image capturing optical system 11 under the control of a system control unit 22. A driving unit 23 drives the solid-state image sensor 12 under the control of the system control unit 22. A signal processing unit 13 applies required signal processes such as noise removal, gain control, A/D conversion, gamma correction, and white balance correction to an analog image signal output from the solid-state image sensor 12, and outputs the processed signal as image data.

A motion vector detection unit 14 detects a motion vector from image data which has undergone the signal processes in the signal processing unit 13. A face detection unit 24 detects a face from the image data output from the signal processing unit 13. An image memory 16 stores the image data output from the signal processing unit 13. A memory read control unit 15 controls read accesses of image data from an image memory 16 based on the motion vector detected by the motion vector detection unit 14. Thus, a range of image data to be recorded on a recording medium 18 or that to be displayed on a display device 20 (to be described later) is decided.

A recording unit 17 records image data read out from the image memory 16 on the recording medium 18. At this time, the recording unit 17 applies compression encoding to the image data by a predetermined method, and records compressed image data that has undergone the compression encoding on the recording medium 18. As the recording medium 18, a nonvolatile semiconductor memory, hard disk, optical disk, and the like are applicable. A display unit 19 converts the resolution of image data read out from the image memory 16 in correspondence with the display resolution of the display device 20, and displays that image data on the display device 20.

The system control unit 22 includes, for example, a CPU, ROM, and RAM, and controls the respective units of this image capturing apparatus 1 using the RAM as a work memory in accordance with a program stored in advance in the ROM.

An example of the image capturing operation in the image capturing apparatus 1 with the aforementioned arrangement will be described below. The driving unit 21 drives the zoom lens, focus lens, and stop in the image capturing optical system 11 based on a control signal from the system control unit 22 to form an object image on the image sensor 12. The image capturing unit 12 is driven by drive pulses generated by the driving unit 21 which is controlled by the system control unit 22 to photoelectrically convert the object image into an electrical signal, and outputs an analog image signal.

The analog image signal output from the image sensor 12 is supplied to the signal processing unit 13, and is converted into a digital image signal by an A/D converter included in the signal processing unit 13. The signal processing unit 13 applies image processes such as a color conversion process, white balance correction process, and gamma correction process to the digital image signal under the control of the system control unit 22. The image memory 16 is used to temporarily store the digital image signal whose signal processes are underway in the signal processing unit 13, and to store image data as the digital image signal that has undergone the signal processes.

The motion vector detection unit 14 executes processing as a motion vector detection apparatus according to the present invention. The motion vector detection unit 14 detects a motion vector from the image data that has undergone the signal processes by the signal processing unit 13, and outputs it as motion vector information. Details of the motion vector detection processing in the motion vector detection unit 14 will be described later. The memory read control unit 15 controls read accesses of image data from the image memory 16 based on the motion vector information detected by the motion vector detection unit 14, thus deciding a range of image data to be recorded or displayed, so as to correct any image blur.

The face detection unit 24 detects a face from the image data that has undergone the signal processes by the signal processing unit 13, and calculates the face position on the image data. The display unit 19 can display the calculated face position on the image data on the display device 20 as a face detection frame together with the image data.

Note that a known face detection technique can be used in face detection of the face detection unit 24. The known face detection technique includes a method based on learning using a neural network, and a method of searching an image for portions such as eyes, a nose, and a mouth characterized by their shapes using template matching, and determining a face if similarities are high. In addition, a method of detecting image feature amounts such as a skin color and eye shapes, and using statistical analysis of the detected feature amounts may be used. That is, a large number of face detection methods have been proposed. In general, a plurality of these methods are combined to improve the face detection precision. As a practical example, a method of detecting a face using Wavelet transformation and image feature amounts, as described in Japanese Patent Laid-Open No. 2002-251380, may be used.

The recording unit 17 converts image data, which has undergone the signal processes by the signal processing unit 13 and is stored in the image memory 16, into data suited to recording on the recording medium 18, and records the converted data on the recording medium 18. For example, the recording unit 17 stores the supplied image data in a file based on, for example, a file system having a hierarchical structure, and records that file on the recording medium 18.

The display unit 19 converts the resolution of image data read out from the image memory 16 in correspondence with the display resolution of the display device 20. The display unit 19 further converts the image data that has undergone the resolution conversion into a signal suited to the display device 20, for example, an analog image signal of an NTSC system, and supplies it to the display device 20.

Figure 2:
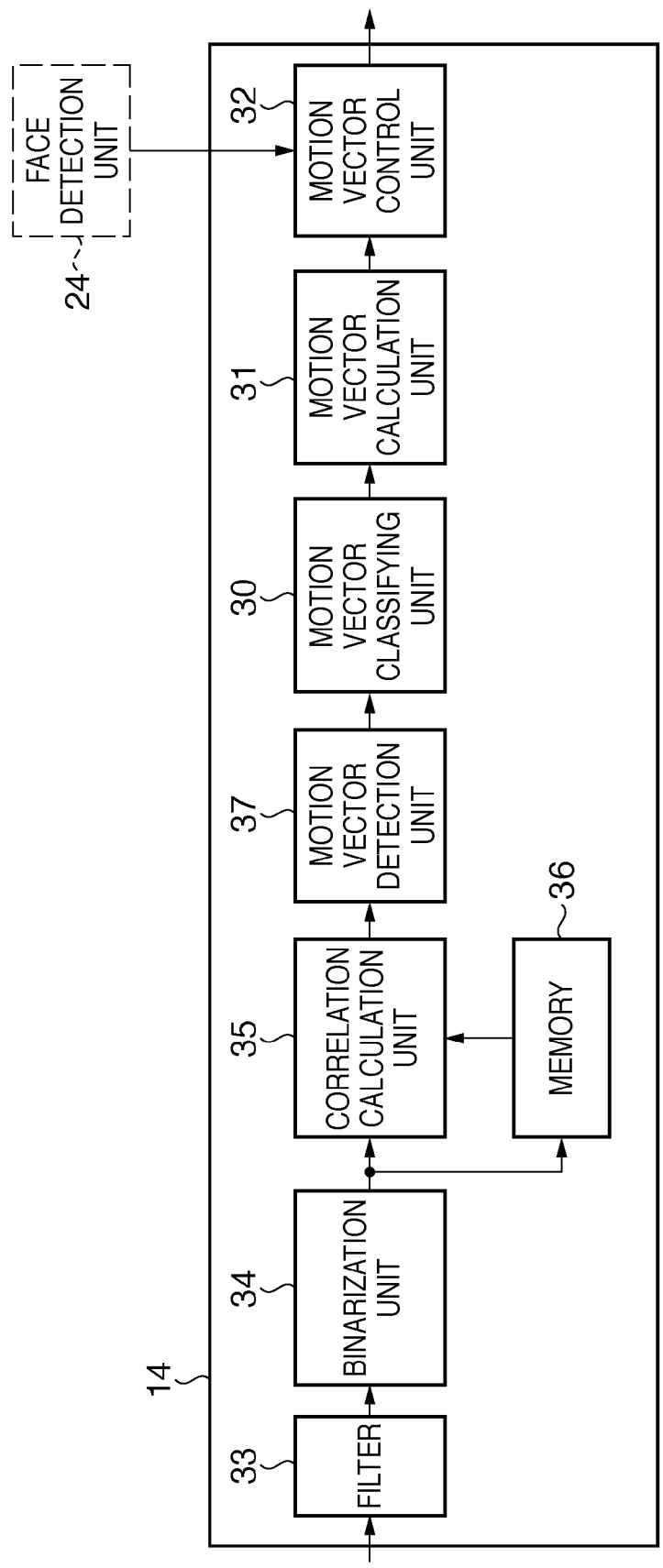
FIG. 2 is a block diagram showing an example of the arrangement of a motion vector detection unit according to the present invention.

FIG. 2 shows an example of the arrangement of the aforementioned motion vector detection unit 14 according to the present invention. Image data based on, for example, a field image, which is output from a signal processing circuit, is stored in the image memory 16, and is also supplied to a filter 33. The filter 33 removes low- and high-frequency components of spatial frequency components from the image data, and extracts spatial frequency components useful for motion vector detection. Image data output from the filter 33 is binarized by a binarization unit 34 with reference to, for example, zero level, is supplied to a correlation calculation unit 35, and is stored in a memory 36. The memory 36 is used to delay the image data by one field.

The correlation calculation unit 35 divides an image region of the image data into blocks each having a predetermined size (for example, 8 pixels×8 pixels), and performs correlation calculations between the current and previous fields for respective blocks according to the block matching method. Correlation values calculated by the correlation calculations are supplied to a motion vector detection unit 37. The motion vector detection unit 37 detects motion vectors for respective blocks from the supplied correlation values. More specifically, the motion vector detection unit 37 searches for a block of the previous field having a smallest correlation value, and decides that relative deviation as a motion vector.

The motion vectors for respective blocks detected by the motion vector detection unit 37 are supplied to a motion vector classifying unit 30. The motion vector classifying unit 30 classifies the supplied blocks into groups based on the motion vector values in the X-direction (horizontal direction of a frame) and Y-direction (vertical direction of the frame). The motion vector values of the blocks classified by the motion vector classifying unit 30 are supplied to a motion vector calculation unit 31.

The motion vector calculation unit 31 calculates representative motion vectors for respective groups classified by the motion vector classifying unit 30. As the representative motion vector, a class value of a class having a maximum frequency in a group can be used when a histogram of frequencies of occurrence of motion vector values is calculated. The present invention is not limited to this. For example, an average value of motion vector values detected in all vector detection regions which belong to a given group can be used as a representative motion vector of that group.

The representative motion vectors for respective groups calculated by the motion vector calculation unit 31 are supplied to a motion vector control unit 32. The motion vector control unit 32 also receives face detection information from the face detection unit 24. The motion vector control unit 32 calculates a motion vector for the entire frame, that is, for the entire image of one field (to be referred to as an entire motion vector hereinafter) using these representative motion vectors for respective groups and the face detection information.

The entire motion vector calculated by the motion vector control unit 32 is supplied to the memory read control unit 15. The memory read control unit 15 controls read accesses of image data stored in the image memory 16 based on this entire motion vector, thus attaining camera shake correction.

Figure 3A:
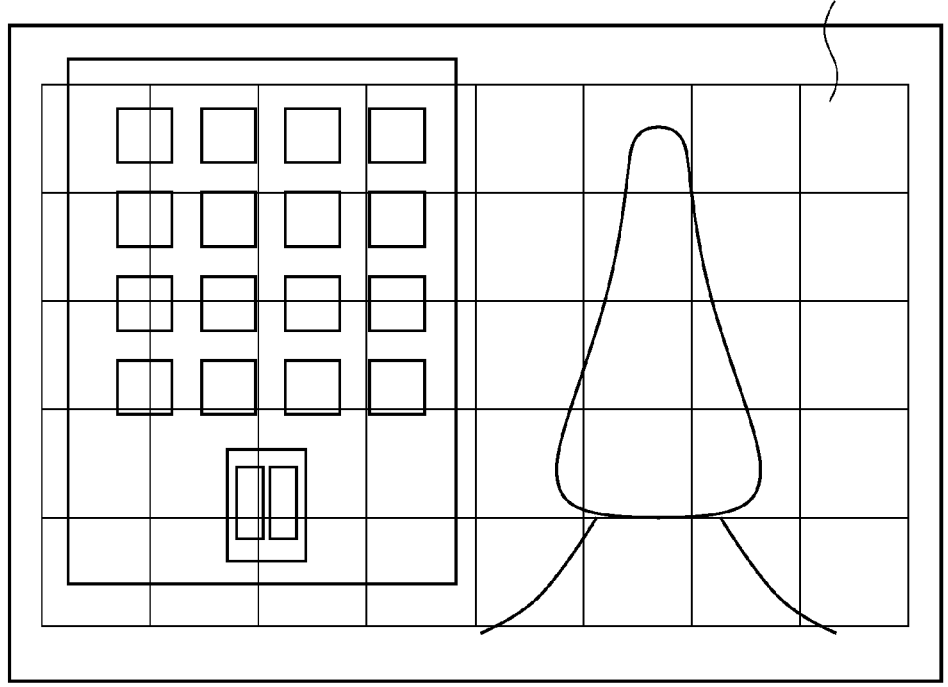
FIGS. 3A and 3B are views for explaining the processing in a motion vector classifying unit.

The processing in the aforementioned motion vector classifying unit 30 will be described in more detail below. Initially, the correlation calculation unit 35 and motion vector detection unit 37 divides a frame based on input captured image data into blocks each having a predetermined size, as exemplified in FIG. 3A. Then, the motion vector detection unit 37 detects motion vectors for respective blocks, as exemplified in FIG. 3B. This block used to detect a motion vector will be referred to as a vector detection region hereinafter.

Figure 4A:
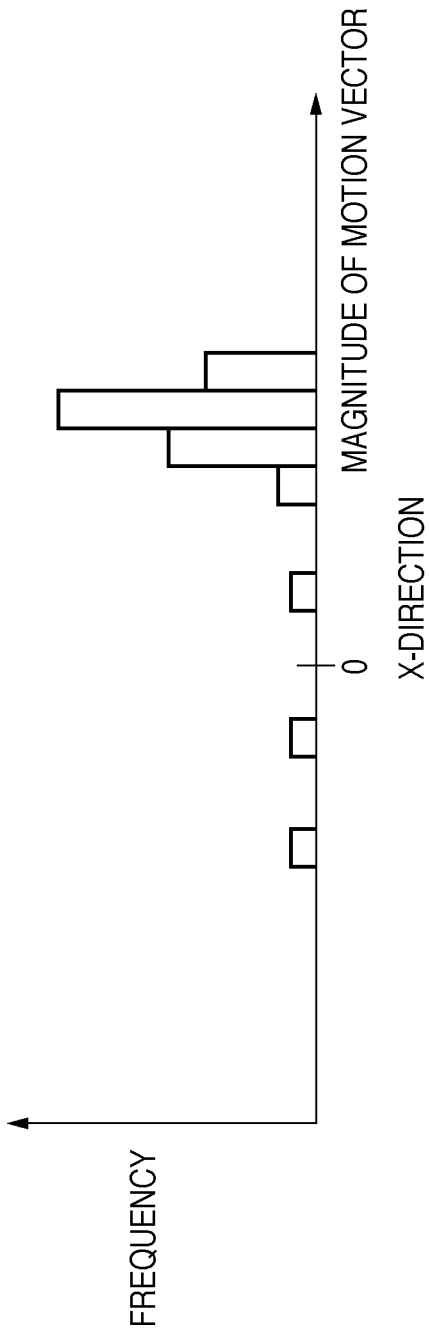
FIGS. 4A and 4B show histograms used to explain the processing in the motion vector classifying unit.
Figure 4B:
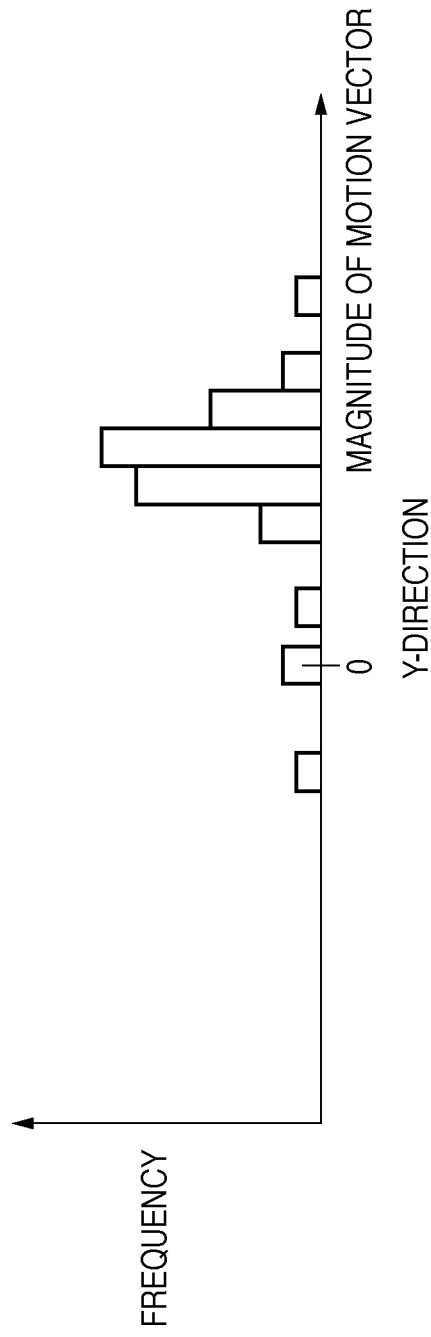

The motion vector classifying unit 30 calculates frequency distributions associated with the magnitudes of the motion vectors in the horizontal and vertical directions of the frame based on the motion vectors for respective vector detection regions. FIGS. 4A and 4B show histograms as examples of the calculated frequency distributions. FIG. 4A shows an example of a histogram generated by plotting the frequency distributions calculated in the horizontal direction (X-direction) of the frame. FIG. 4B shows an example of a histogram generated by plotting the frequency distributions calculated in the vertical direction (Y-direction) of the frame.

More specifically, the motion vector classifying unit 30 divides the magnitudes of motion vectors into predetermined ranges to set classes. The motion vector classifying unit 30 determines a class to which a given vector detection region belongs based on the magnitude of the corresponding motion vector detected by the motion vector detection unit 37. The motion vector classifying unit 30 classifies the vector detection region to the class according to the determination result, and adds a frequency to the class. The motion vector classifying unit 30 repeats this processing for all vector detection regions in the frame in the horizontal and vertical directions of the frame.

Figure 3B:
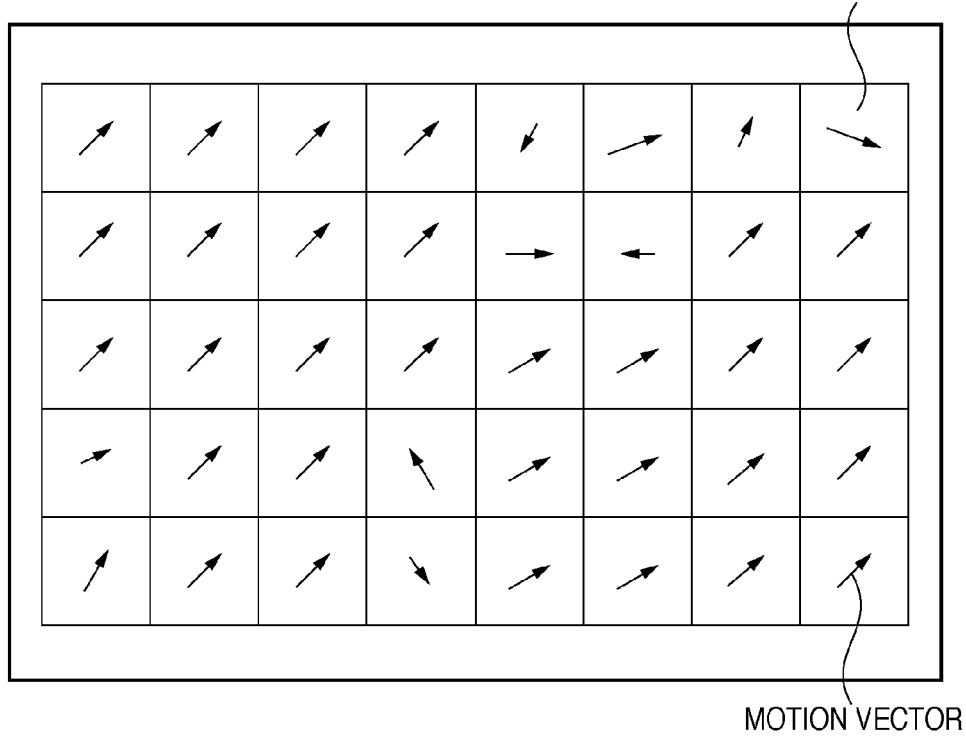

According to the example of FIG. 3B, since the frame is divided into 40 vector detection regions, a total of 40 motion vectors are detected as those in the frame. That is, the total of frequencies in the frame is 40. By distributing the frequencies=40 to classes based on the magnitudes of the motion vectors and adding them for respective classes, the frequencies (frequencies of occurrence) of the vector detection regions in respective classes can be obtained. Note that the class value of each class having a certain range can use an intermediate value between the upper and lower limit values of that class.

Figure 5A:
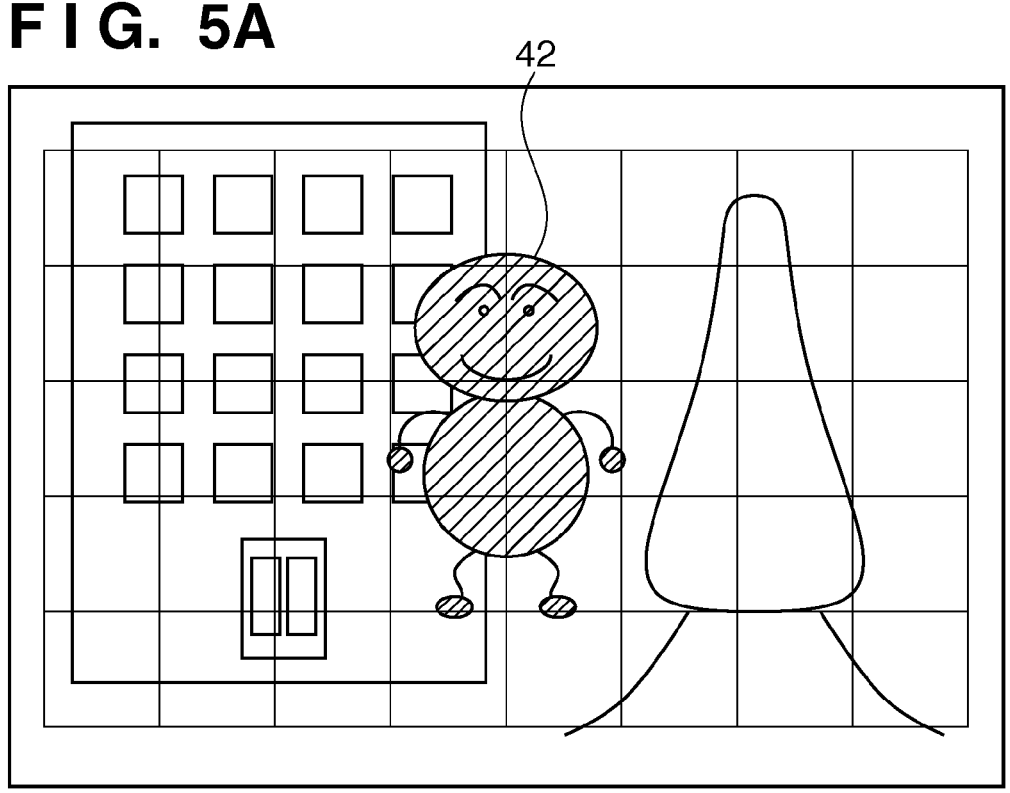
FIGS. 5A and 5B are views for explaining group classification of vector detection regions based on frequency distributions.

The motion vector classifying unit 30 further classifies the respective vector detection regions into groups based on the frequency distributions of the motion vectors. The group classification of the vector detection regions based on the frequency distributions will be described below with reference to FIGS. 5A, 5B, and 6A. A case will be examined below wherein a principal object 42 (indicated by hatching) included in a frame moves between fields, as shown in FIG. 5A. In this case, motion vectors in a region 43 defined by vector detection regions including the principal object 42 are different from those in vector detection regions other than the region 43, as exemplified in FIG. 5B. For example, in the example shown in FIGS. 5A and 5B, the region 43 moves in an upper right direction of the frame, and a portion other than the region 43 moves in an upper left direction of the frame. Note that a region defined by vector detection regions including a principal object will be referred to as a principal object region hereinafter.

Figure 6A:
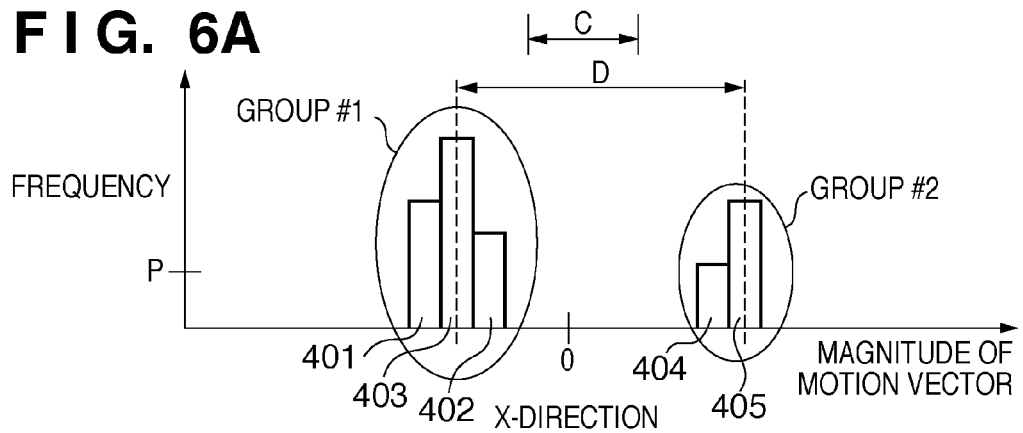
FIG. 6A is a view for explaining group classification of vector detection regions based on frequency distributions.

At this time, the frequency distributions based on the magnitudes of the motion vectors in, for example, the horizontal direction of the frame form two peaks, as exemplified in a histogram in FIG. 6A. At this time, a group is formed based on classes to which the frequencies that form one peak belong. In the example shown in FIG. 6A, group #1 based on a peak of frequencies of motion vectors, which move in the upper left direction of the frame, of the portion other than the region 43, and group #2 based on a peak of frequencies of motion vectors, which move in the upper right direction of the frame, of the region 43 are formed.

Figure 5B:
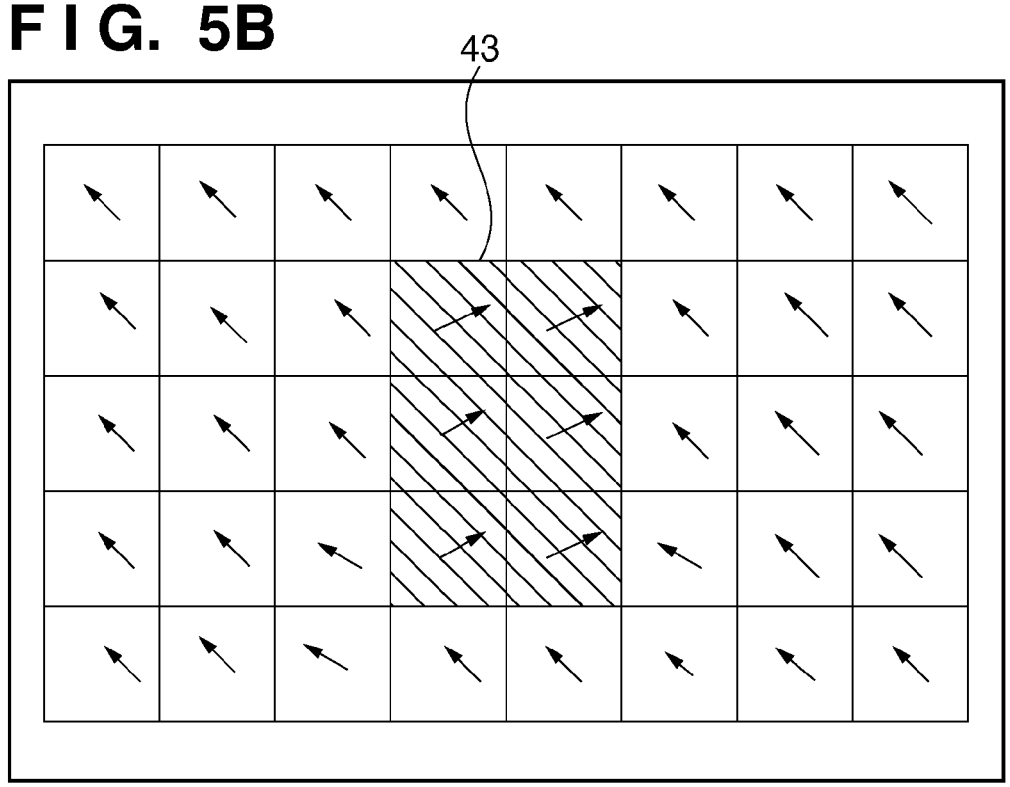

As can be understood from comparison between FIGS. 5A and 5B and FIG. 6A, group #2 is based on the motion vectors of the region 43 including the object 42, and group #1 is based on the motion vectors of the portion other than the region 43

(background region). However, the two groups that can be separated are merely detected in terms of data. That is, in terms of data, which of groups #1 and #2 is that based on motion vectors caused by only a camera shake or that based on motion vectors defined by adding the motion vectors of the object to those of the camera shake cannot be determined. A method of discriminating a group which represents motion vectors caused by only the camera shake or that based on motion vectors defined by adding the motion vectors of the object to those of the camera shake from those based on the motion vectors will be described later.

A method of classifying vector detection regions into groups based on the detected motion vectors will be described in more detail below. The motion vector classifying unit 30 searches the frequency distributions of the motion vectors obtained, as shown in FIG. 6A, for relative maxima (peaks) like classes 403 and 405. Assume that the motion vector classifying unit 30 detects a frequency larger than a predetermined threshold p as an effective frequency upon group classification, and detects a frequency which is larger than this threshold p and is larger than those of two neighboring classes within a predetermined range as a relative maximum.

Furthermore, when a plurality of relative maxima are detected, the motion vector classifying unit 30 calculates a distance D between classes corresponding to the neighboring relative maxima. Then, the motion vector classifying unit 30 determines whether or not this distance D exceeds a predetermined threshold c. Note that the distance c is set to be a value larger than a motion vector detection error by the motion vector detection unit 37.

If the calculated distance D exceeds the predetermined threshold c, the motion vector classifying unit 30 determines that classes to which the frequencies that define the respective extreme values belong form independent groups. On the other hand, if the calculated distance D does not exceed the predetermined threshold c, the motion vector classifying unit 30 determines that the classes to which the frequencies that define the respective extreme values belong form a single group.

In the example of FIG. 6A, the motion vector classifying unit 30 detects classes having frequencies larger than the threshold p as effective frequencies upon group classification as classes 401 to 405. Then, the motion vector classifying unit 30 detects the classes 403 and 405 having frequencies larger than those of the neighboring classes as relative maxima. Since a distance between the classes 403 and 405 detected as the relative maxima is the distance D and is larger than the threshold c, the motion vector classifying unit 30 can determine that the classes 403 and 405 can be classified into independent groups.

Furthermore, since the class 402 which neighbors the class 403 as a relative maximum has an effective frequency which exceeds the threshold p and has a distance from the class 403 which does not exceed the threshold c, the motion vector classifying unit 30 classifies the class 402 to the same group #1 as that of the class 403. The same applies to the class 401 which neighbors the class 403. Since the class 404 which neighbors the class 405 that assumes a relative maximum has an effective frequency which exceeds the threshold p and has a distance from the class 405 which does not exceed the threshold c, the motion vector classifying unit 30 classifies the class 404 to the same group #2 as that of the class 405.

In this manner, the motion vector classifying unit 30 classifies the vector detection regions into one or more groups based on the motion vectors detected for respective vector detection regions. Information of each group obtained by the motion vector classifying unit 30 is held in, for example, a memory (not shown) included in the motion vector detection unit 14. The group information includes, for example, identification information used to identify a group, information (e.g., coordinate information) indicating vector detection regions included in the group, and information indicating the motion vectors of those vector detection regions.

The processing in the aforementioned motion vector calculation unit 31 will be described below. The motion vector calculation unit 31 calculates representative motion vectors for respective groups classified by the motion vector classifying unit 30. As the representative motion vector, the class value of a class having a largest frequency in each group is used. Alternatively, an average value of the motion vector values detected from all vector detection regions which belong to each group may be used as the representative motion vector of that group.

<Entire Motion Vector Calculation Processing in First Embodiment>

The processing in the motion vector control unit 32 will be described in more detail below. As described above, the motion vector control unit 32 calculates a motion vector for the entire frame, that is, the entire image of one field (entire motion vector). The motion vector control unit 32 calculates an entire motion vector using the group classification result of the motion vector classifying unit 30, the representative motion vector values of the groups calculated by the motion vector calculation unit 31, face detection information detected by the face detection unit 24, and the like.

Figure 7:
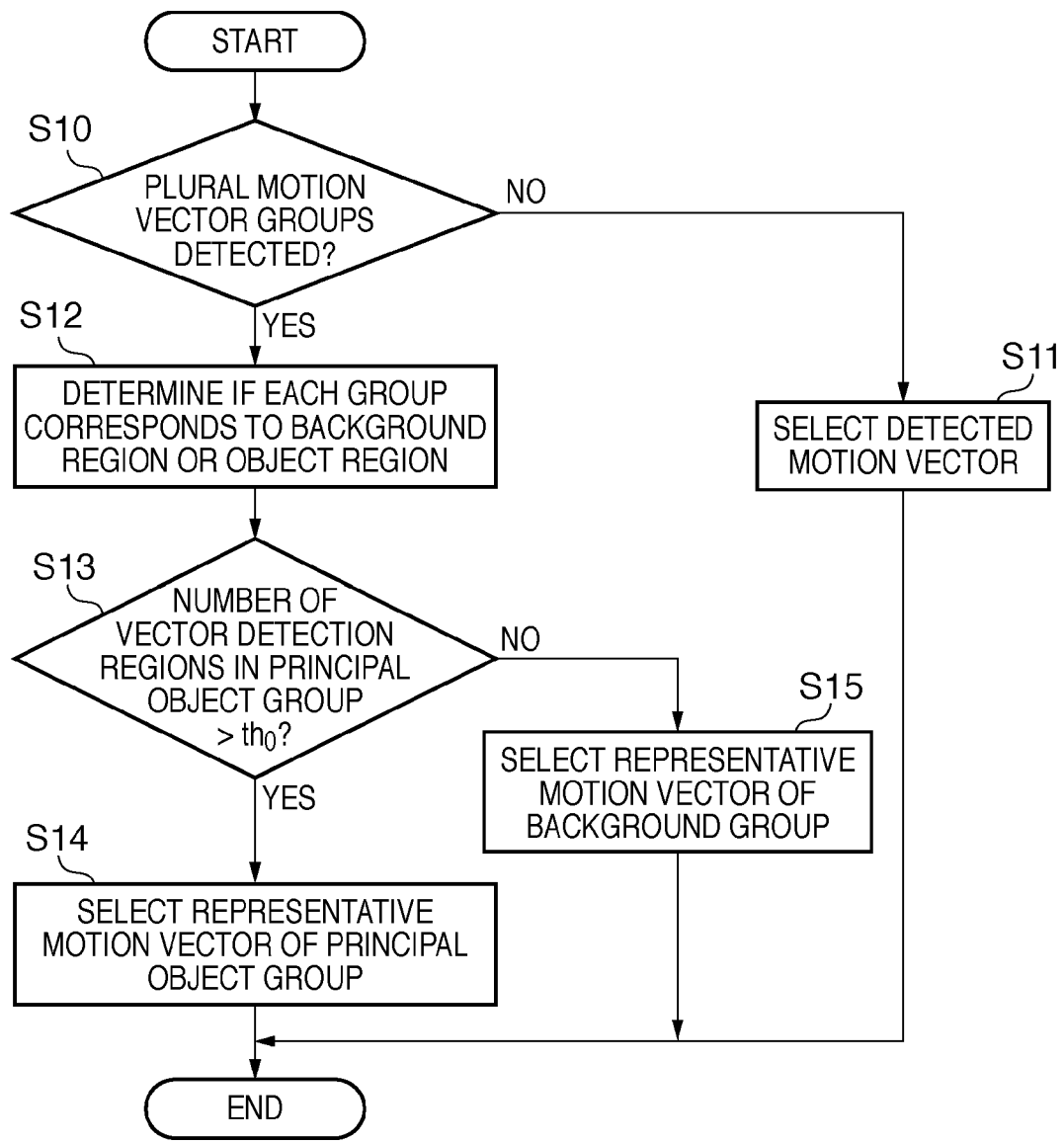
FIG. 7 is a flowchart showing an example of entire motion vector calculation processing according to the first embodiment of the present invention.

FIG. 7 is a flowchart showing an example of the entire motion vector calculation processing according to the first embodiment of the present invention. Respective processes in the flowchart shown in FIG. 7 are executed by the motion vector control unit 32 under the control of the system control unit 22.

The motion vector control unit 32 determines in step S10 whether or not the motion vector classifying unit 30 detects a plurality of groups in the current image data, that is, in image data of the current field. If it is determined that the motion vector classifying unit 30 detects one group, the process advances to step S11, and the motion vector control unit 32 adopts the representative motion vector of the detected group as an entire motion vector. Then, the motion vector control unit 32 starts processing for the next field image (not shown).

On the other hand, if it is determined in step S10 that the motion vector classifying unit 30 detects a plurality of groups, the process advances to step S12. In step S12, the motion vector control unit 32 determines whether each of the groups detected by the motion vector classifying unit 30 is defined based on vector detection regions of the background region or those of the principal object region.

<First Method of Determination Processing>

The first method of the determination processing in step S12 will be described in detail below. Assume that the current field image is that exemplified in FIG. 5A described above, motion vectors in respective vector detection regions are detected, as shown in FIG. 5B, and the respective vector detection regions are classified into groups #1 and #2, as shown in FIG. 6A. In step S12, the motion vector control unit 32 defines coordinates of the respective vector detection regions in the frame, as exemplified in FIG. 8A.

Next, the motion vector control unit 32 calculates barycentric coordinates (GX, GY) of vector detection regions which belong to each of groups #1 and #2 and a dispersion value Z as a value of statistic measure indicating a dispersion of the coordinates of the respective vector detection regions with respect to the barycentric coordinates. Assume that the barycentric coordinate GX of a group in the X-direction (horizontal direction of the frame) is an average value of coordinates X of the respective vector detection regions which belong to that group in the X-direction. The same applies to the barycentric coordinate GY of the group in the Y-direction (vertical direction of the frame).

For example, vector detection regions which belong to group #2 shown in FIG. 6A described above are six vector detection regions included in a hatched region 50 shown in FIG. 8B. That is, the number of blocks included in the region 50 is six. The coordinates of the respective vector detection regions are:

Region #1: $(X_3, Y_1)$
Region #2: $(X_3, Y_2)$
Region #3: $(X_3, Y_3)$
Region #4: $(X_4, Y_1)$
Region #5: $(X_4, Y_2)$
Region #6: $(X_4, Y_3)$ A barycentric coordinate $GX_{02}$ of group #2 in the X-direction is calculated by adding the X-coordinate values of the respective vector detection regions and dividing the sum by the number of vector detection regions, as given by:

$$GX_{02} = (X_3 + X_3 + X_3 + X_4 + X_4 + X_4)/6 \quad (1)$$

A barycentric coordinate $GY_{02}$ of group #2 in the Y-direction is similarly calculated by:

$$GY_{02} = (Y_1 + Y_2 + Y_3 + Y_1 + Y_2 + Y_3)/6 \quad (2)$$

The dispersion value Z of the coordinates of the respective vector detection regions with respect to the barycentric coordinates is calculated as follows. For each vector detection region, the square of the difference between an X-coordinate and the barycentric coordinate GX of that group in the X-direction, and the square of the difference between a Y-coordinate and the barycentric coordinate GY of that group in the Y-direction are added, and an average value of the sums in the group is calculated as the dispersion value Z.

A dispersion value $Z_{02}$ of group #2 is calculated by:

$$Z_{02} = [\{(X_3 - GX_{02})^2 + (Y_1 - GY_{02})^2\} + \{(X_3 - GX_{02})^2 + (Y_2 - GY_{02})^2\} + \{(X_3 - GX_{02})^2 + (Y_3 - GY_{02})^2\} + \{(X_4 - GX_{02})^2 + (Y_1 - GY_{02})^2\} + \{(X_4 - GX_{02})^2 + (Y_2 - GY_{02})^2\} + \{(X_4 - GX_{02})^2 + (Y_3 - GY_{02})^2\}]/6 \quad (3)$$

In the above description, the barycentric coordinates $(GX_{02}, GY_{02})$ and dispersion value $Z_{02}$ of group #2 shown in FIG. 6A are calculated. Also, barycentric coordinates $(GX_{01}, GY_{01})$ and a dispersion value $Z_{01}$ of group #1 are similarly calculated.

As can be seen from the example of FIG. 6A in which a region occupied by group #2 is smaller than that occupied by group #1, the dispersion values of groups #1 and #2 satisfy $Z_{02} < Z_{01}$. Normal image capturing is done so that a main object as an object to be captured such as a person (to be referred to as a principal object hereinafter) is located at the center of a frame. For this reason, the aforementioned group having a smaller dispersion value Z of the two groups detected from the captured image frame is more likely to be a principal object region including an object image of the principal object. Therefore, group #2 having a smaller dispersion value Z can be determined as a group of the principal object region.

The motion vector control unit 32 performs calculations given by equations (1) to (3) above for groups #1 and #2 based on respective pieces of information of the groups calculated by the motion vector classifying unit 30. Then, the motion vector control unit 32 compares the dispersion values $Z_{01}$ and $Z_{02}$ of groups #1 and #2 obtained as a result of the calculations to determine which of groups #1 and #2 is a group of the principal object region.

Note that the calculation method of the dispersion value given by equations (1) to (3) is an example, and other methods may be used. For example, a rectangle may be formed by connecting, using straight lines, the coordinates of vector detection regions at four corners included in each of a plurality of groups, and the sum of the four sides of that rectangle may be adopted as the dispersion value Z.

<Second Method of Determination Processing>

The second method of the determination processing in step S12 in FIG. 7 will be described in detail below. Assume that the current field image is that exemplified in FIG. 9A, and the central portion of the frame includes a principal object 60 as a person. The face detection unit 24 performs face detection for image data of this current field image, and calculates the position of a detected face. The calculation result of the face position is displayed as a bold face detection frame 61 in FIG. 9A.

Figure 6B:
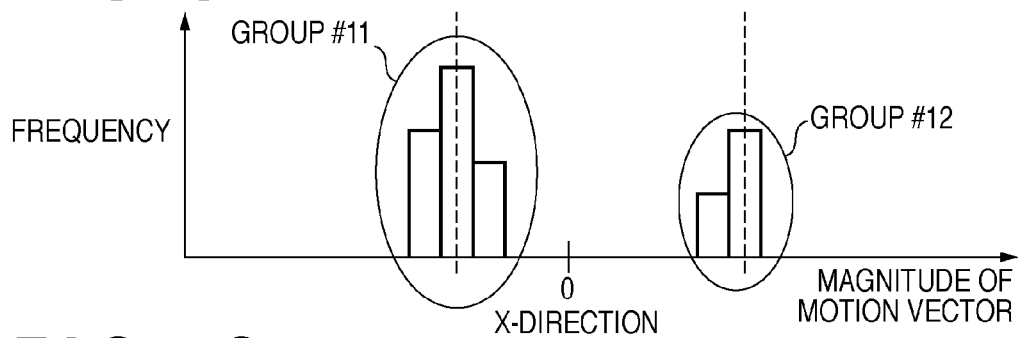
FIG. 6B shows a histogram for explaining determination processing for vectors detected by the motion vector classifying unit by a second determination method.
Figure 9A:
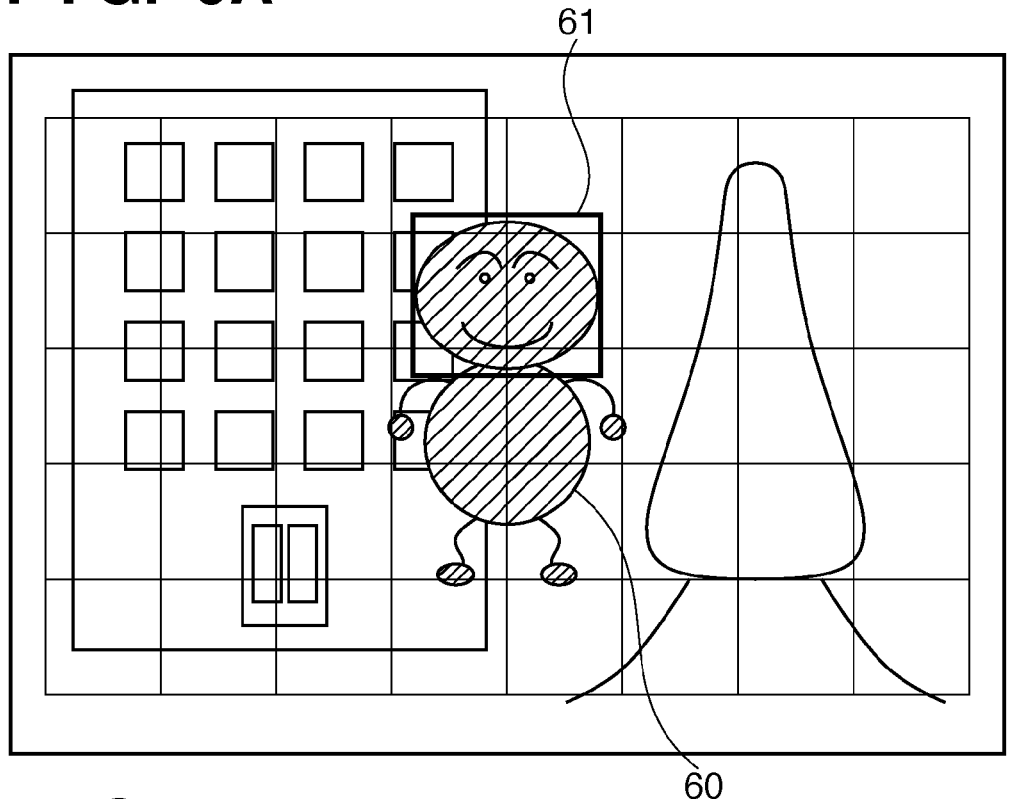
FIGS. 9A and 9B are views for explaining the determination processing of vectors detected by the motion vector classifying unit by the second determination method.
Figure 9B:
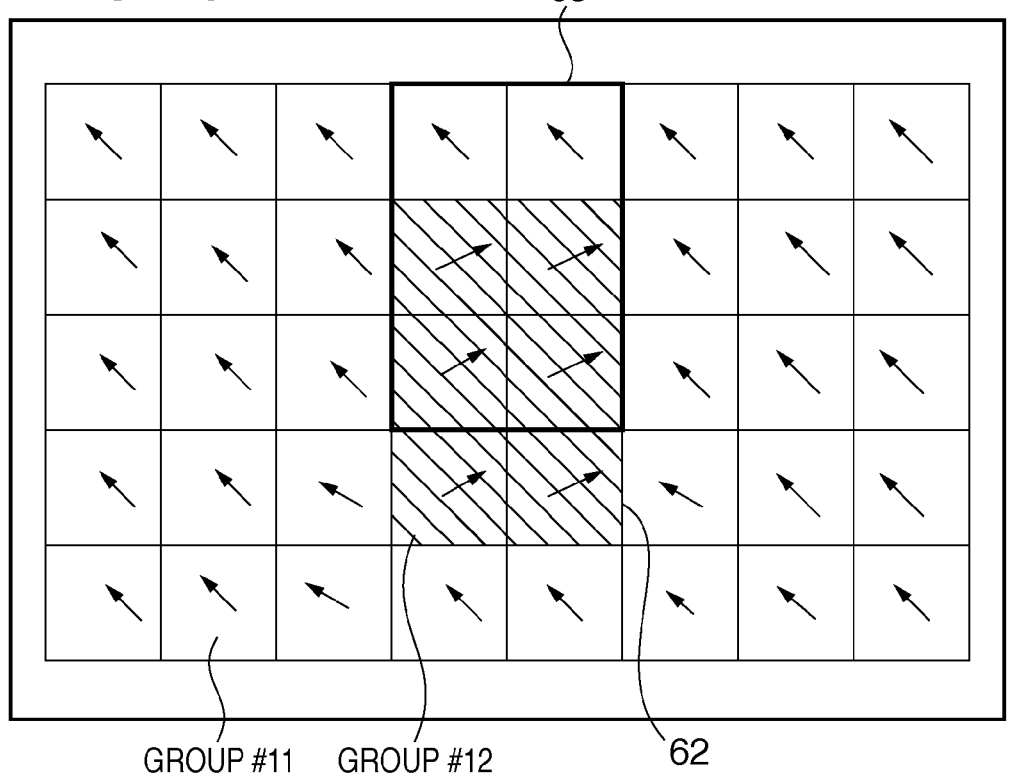

FIG. 9B shows an example of motion vectors detected by the motion vector detection unit 37 from vector detection regions of the current field image shown in FIG. 9A. When the principal object 60 in FIG. 9A is moving with respect to the background, motion vectors of a principal object region 62, which is indicated by hatching in FIG. 9B, and includes the principal object 60, are different from those of the remaining region in the frame. At this time, the frequency distributions based on the motion vector values in, for example, the X-direction form two relative maxima of groups #11 and #12, as exemplified in a histogram of FIG. 6B. As can be seen from FIG. 9B, group #12 is based on the motion vectors of the principal object region 62, and group #11 is based on the motion vectors of a region other than the principal object region 62, that is, the background region.

A region 63 indicated by a bold frame in FIG. 9B corresponds to vector detection regions including the interior of the face detection frame 61 shown in FIG. 9A. In this region, the number of vector detection regions which belong to group #11 as the background region is two, and the number of vector detection regions which belong to group #12 as the principal object region 62 is four. Since the possibility of the principal object region becomes higher with increasing number of vector detection regions having a portion common to the interior of the face detection frame 61, it can be determined that group #12 is that of the principal object region.

The motion vector control unit 32 specifies a group of a principal object region based on respective pieces of group information calculated by the motion vector classifying unit 30 and face position information detected by the face detection unit 24. That is, the motion vector control unit 32 detects an overlapped portion of the vector detection regions included each of groups #11 and #12 and those including the face detection frame 61. Then, the motion vector control unit 32 determines group #11 or #12 having a larger overlapped portion as the group of the principal object region.

As described above, using the face detection function, when the motion vector classifying unit 30 detects a plurality of groups, and the principal object is a person, the background region and principal object region can be easily distinguished from each other.

In the above description, one object moves with respect to the background. However, in actual image capturing, a plurality of objects may often move with respect to the background. In the first embodiment, of a plurality of objects included in the frame, an object which has a largest occupation ratio on the frame is selected as a principal object, and the vector detection values of other object regions are excluded from those to be processed. That is, even when a plurality of moving objects with respect to the background are included in the frame, it is deemed that only one object to be processed is included.

For example, when vector detection regions are classified into three or more groups in the current field image, the aforementioned first method of the determination processing determines a group having a largest dispersion value Z as a background group, and groups other than the background group as object groups. Then, the first method may compare the sum totals of frequencies in classes included in the plurality of object groups, and may determine an object group which assumes a largest value as an object to be processed (object group to be processed). In this case, another object group (third group) is excluded from an object to be processed.

Also, the aforementioned second method of the determination processing determines a group having a smallest number of vector detection regions including a face region as a background group, and groups other than the background group as object groups. Then, the second method may compare the sum totals of frequencies in classes included in the plurality of object groups, and may determine an object group which assumes a largest value as an object to be processed (object group to be processed). In this case as well, another object group (third group) is excluded from an object to be processed.

Referring back to the flowchart in FIG. 7, after the group of the principal object region is determined in step S12, the process advances to step S13. The motion vector control unit 32 determines in step S13 whether or not the number of vector detection regions which belong to the group determined in step S12 as the principal object region (to be referred to as a principal object group hereinafter) is larger than a predetermined threshold $th_0$.

If it is determined in step S13 that the number of vector detection regions which belong to the principal object group is larger than the threshold $th_0$, the process advances to step S14. In step S14, the motion vector control unit 32 adopts the representative motion vector of the principal object group as an entire motion vector.

On the other hand, if it is determined in step S13 that the number of vector detection regions which belong to the principal object group is not larger than (less than or equal to) the threshold $th_0$, the process advances to step S15. In step S15, the motion vector control unit 32 adopts the representative motion vector of the group of the background region (to be referred to as a background group hereinafter) as an entire motion vector. Then, the motion vector control unit 32 starts processing for the next field image (not shown).

Figure 6C:
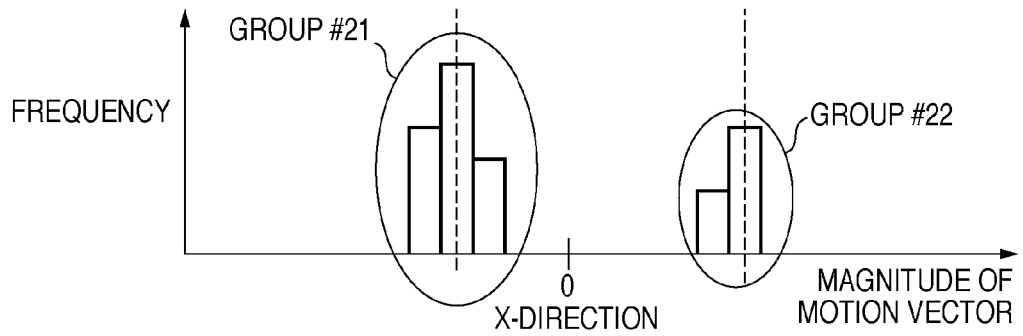
FIG. 6C shows a histogram for explaining the processing result according to the first embodiment of the present invention in more detail.
Figure 10A:
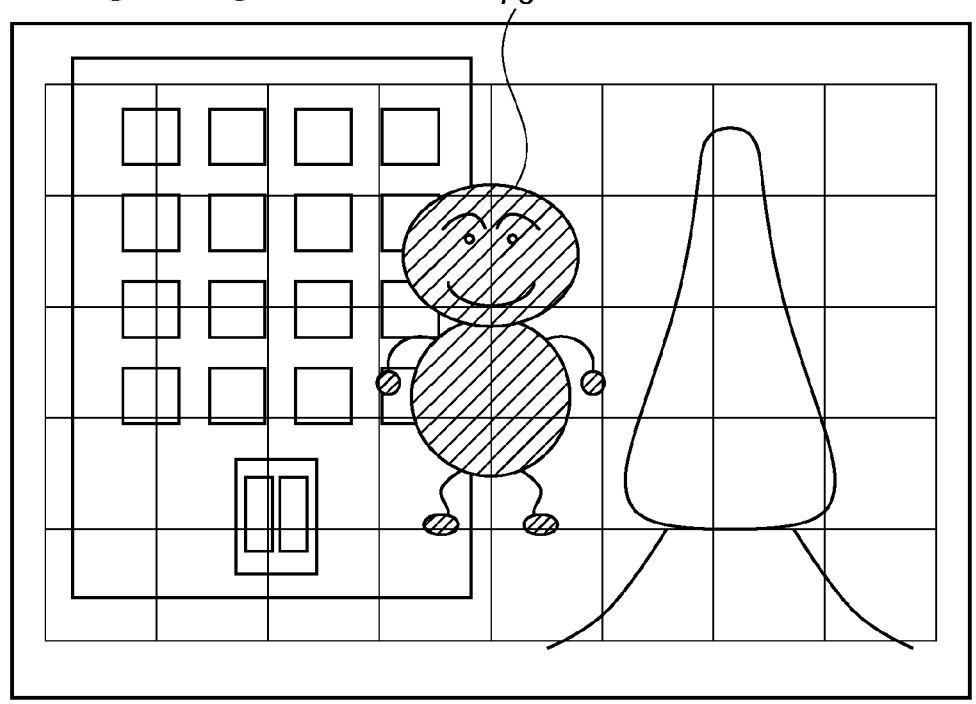
FIGS. 10A and 10B are views for explaining the processing result according to the first embodiment of the present invention in more detail.
Figure 10B:
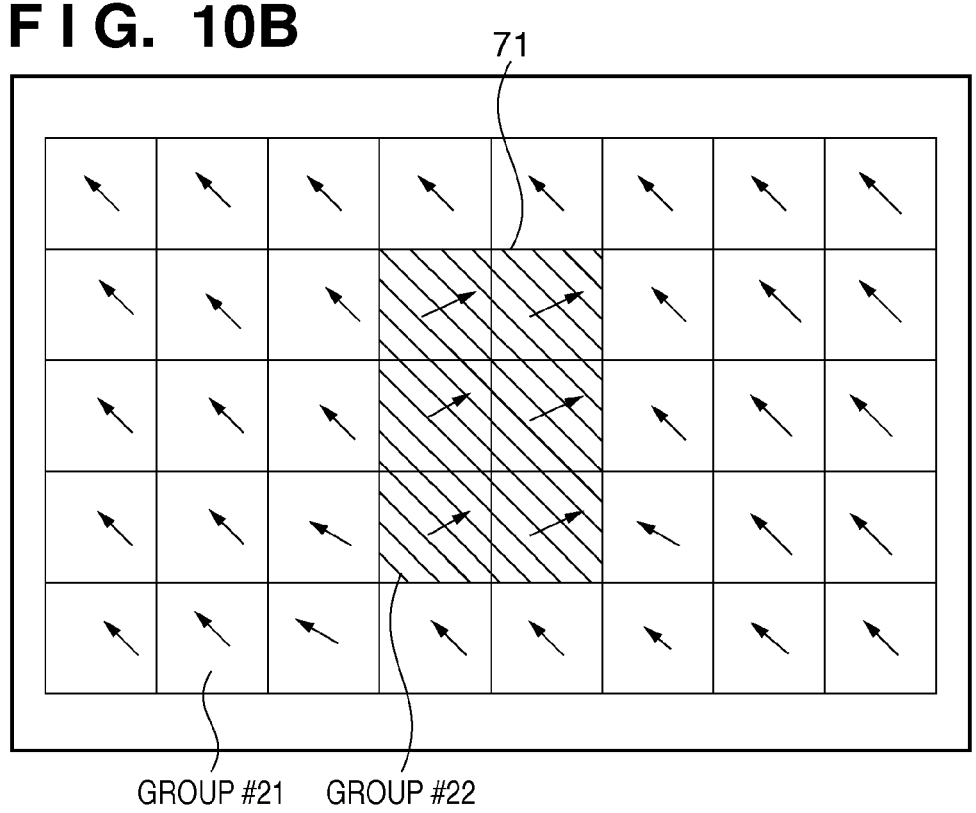

For example, a case will be examined below wherein a principal object 70 having a relatively small occupation ratio in the frame is included in the central portion of the current field image, as shown in FIG. 10A. In this case, assume that the motion vector detection results in the current field image are different in a region 71 including six vector detection regions in the central portion of the frame, and the remaining region, as shown in FIG. 10B. As exemplified in a histogram shown in FIG. 6C, the frequency distributions based on motion vector values of the motion vector detection results include two relative maxima of group #21 of a background region and group #22 of a principal object region.

In such case, the motion vector control unit 32 determines that the number of vector detection regions which belong to group #22 of the principal object region is less than or equal to the threshold $th_0$, and can calculate motion vectors in group #21 of the background region with high precision.

Figure 11A:
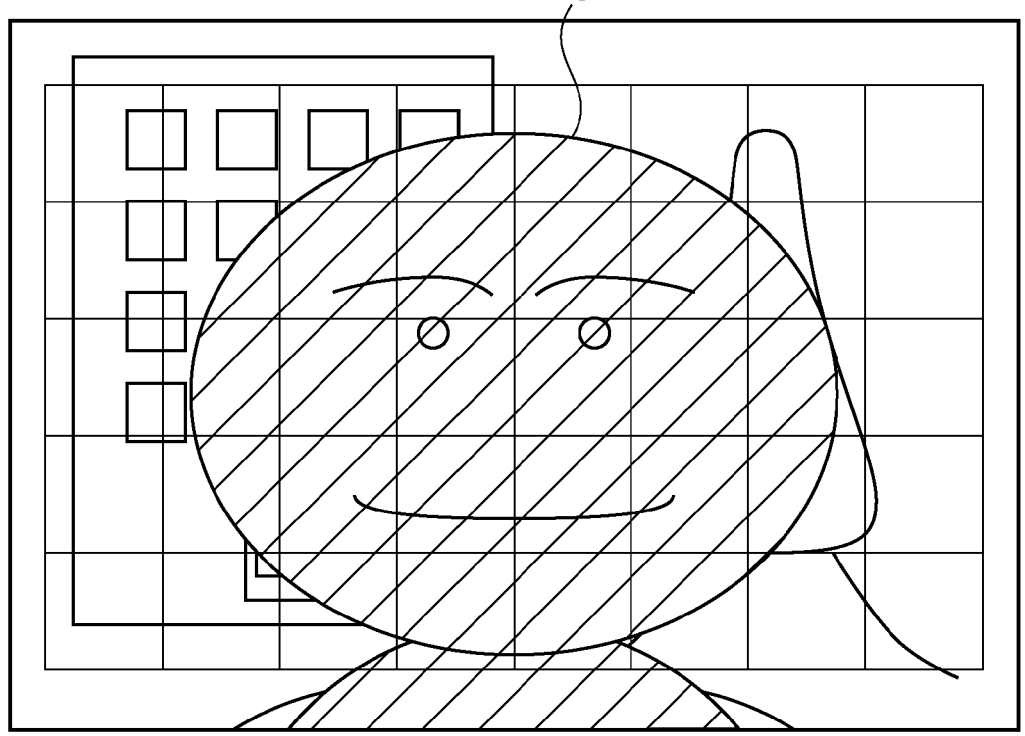
FIGS. 11A and 11B are views for explaining the processing result according to the first embodiment of the present invention in more detail.

As another example, a case will be examined below wherein a principal object 75 having a relatively large occupation ratio in the frame is included in the central portion of the current field image, as shown in FIG. 11A. As shown in FIG. 11A, when the occupation ratio of the principal object in the frame is relatively large, a photographer normally captures an image of an object to be located at the center of the frame. For this reason, a video picture with a high camera stabilization effect can be obtained by changing the read position of the image memory, so that the principal object remains at the original position in the frame, using the motion vector detection values of only the principal object region in place of those of the background region.

Figure 6D:
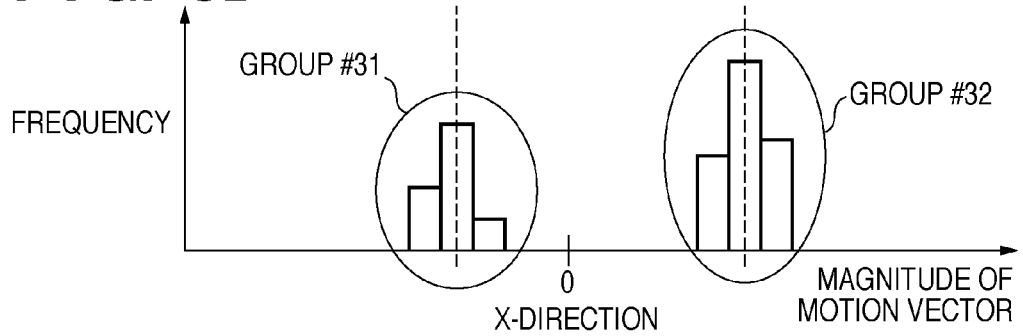
FIG. 6D shows a histogram for explaining the processing result according to the first embodiment of the present invention in more detail.
Figure 11B:
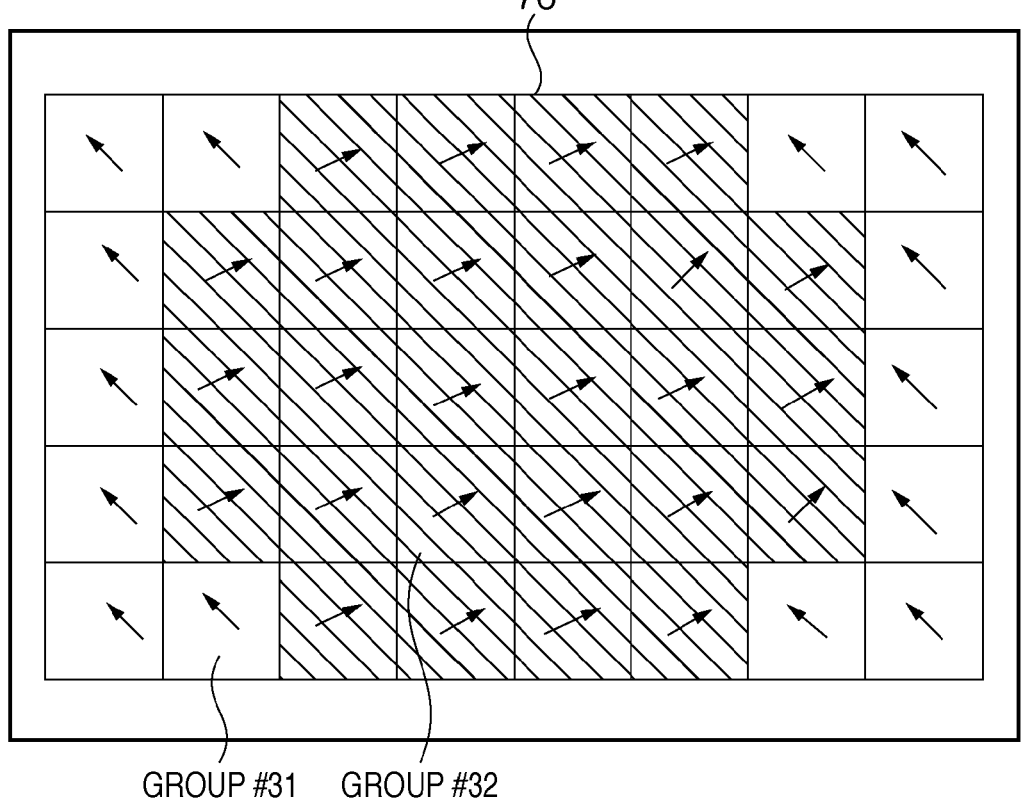

In this case, assume that the motion vector detection results in the current field image are different in a region 76 including 26 vector detection regions in the central portion of the frame, and the remaining region, as shown in FIG. 11B. As exemplified in a histogram in FIG. 6D, the frequency distributions based on the motion vector values of the motion vector detection results include two relative maxima of group #31 of the background region and group #32 of the principal object region.

In such case, the motion vector control unit 32 determines that, for example, the number of vector detection regions which belong to group #32 of the principal object region is larger than the threshold $th_0$, and can calculate motion vectors in group #32 as the principal object region with high precision.

As described above, according to the first embodiment of the present invention, even when the occupation ratio of the principal object in the frame is relatively large, the background region and principal object region can be appropriately detected, and motion vector values with high precision can be calculated.

Second Embodiment

The second embodiment of the present invention will be described below. The second embodiment determines whether or not a group of a background region (background group) was selected as a group used to calculate an entire motion vector in previous image data, for example, in image data one field before. Based on this determination result, a threshold upon determining whether the entire motion vector is calculated using either the background region or principal object region is set.

Note that the second embodiment can adopt the arrangements of the image capturing apparatus 1 and motion vector detection unit 14 described in the first embodiment intact. Also, since the processes from the filter 33 to the motion vector calculation unit 31 in the motion vector detection unit 14 are the same as those described in the first embodiment, a description thereof will not be repeated.

Figure 12:
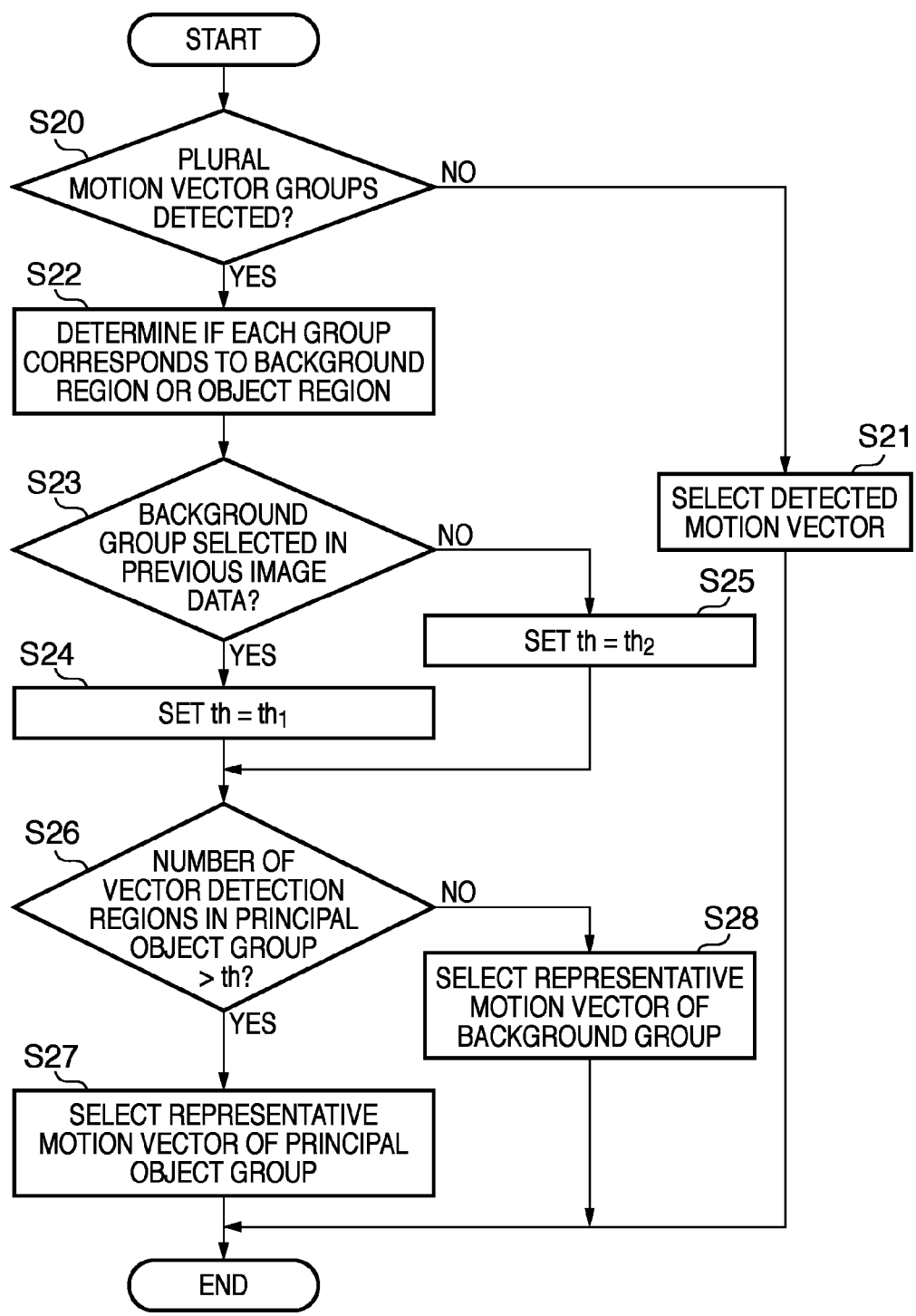
FIG. 12 is a flowchart showing an example of entire motion vector calculation processing according to the second embodiment of the present invention.

FIG. 12 is a flowchart showing an example of entire motion vector calculation processing according to the second embodiment. Respective processes in the flowchart shown in FIG. 12 are executed by a motion vector control unit 32 under the control of a system control unit 22.

In the flowchart shown in FIG. 12, the processes in steps S20 to S22 are the same as those in steps S10 to S12 in the flowchart shown in FIG. 7. That is, the motion vector control unit 32 determines in step S20 whether or not a motion vector classifying unit 30 detects a plurality of groups in the current image data, that is, in image data of the current field. If it is determined that the motion vector classifying unit 30 detects one group, the process advances to step S21, and the motion vector control unit 32 adopts the representative motion vector of the detected group as an entire motion vector. Then, the motion vector control unit 32 starts processing for the next field image (not shown).

On the other hand, if it is determined in step S20 that the motion vector classifying unit 30 detects a plurality of groups, the process advances to step S22. Then, the motion vector control unit 32 determines by the method described using FIGS. 8A to 6D if each of the groups detected by the motion vector classifying unit 30 is that defined by vector detection regions of a background region or that defined by those of a principal object region.

Upon completion of the determination processing in step S22, the process advances to step S23. The motion vector control unit 32 determines in step S23 whether or not a background group of a plurality of groups detected by the motion vector classifying unit 30 was selected as a group used to calculate an entire motion vector in previous image data. The previous image data is image data one field before, which is temporally immediately before image data to be processed. If it was not determined in the previous image data that the motion vector classifying unit 30 detected a plurality of groups, it is deemed that the background group was selected as a group used to calculate an entire motion vector.

If it is determined in step S23 that the background group was selected, the process advances to step S24, and the motion vector control unit 32 sets a first value $th_1$ as a threshold th used in step S26 to be described later.

On the other hand, if it is determined in step S23 that the background group was not selected, that is, the principal object group was selected, the process advances to step S25. In step S25, the motion vector control unit 32 sets a second value the smaller than the first value $th_1$ as the threshold th used in step S26 to be described later.

After the threshold th is set in step S24 or S25, the process advances to step S26. The motion vector control unit 32 determines in step S26 whether or not the number of vector detection regions which belong to the principal object group determined as the principal object region in step S22 is larger than the threshold th set in step S24 or S25.

If it is determined in step S26 that the number of vector detection regions which belong to the principal object group is larger than the threshold th, the process advances to step S27. In step S27, the motion vector control unit 32 adopts a representative motion vector of the principal object group as a motion vector for the entire frame.

On the other and, if it is determined in step S26 that the number of vector detection regions which belong to the principal object group is not larger than the threshold th, the process advances to step S28. In step S28, the motion vector control unit 32 adopts a representative motion vector of the background group as an entire motion vector. Then, the motion vector control unit 32 starts processing for the next field image (not shown).

In the second embodiment, the relationship between the first value $th_1$ and second value $th_2$ to be set as the threshold th in step S24 or S25 described above is set to meet the first value $th_1$ > the second value $th_2$.

In this way, when the background group was selected in the previous image data, the background group is easier to be selected also in the current image data. When the number of motion vector detection regions which belong to the principal object region temporarily exceeds the threshold $th_1$, and the principal object group is selected, the threshold th is changed to the threshold $th_2$ smaller than the threshold $th_1$. Thus, the principal object group is easier to be selected.

Therefore, frequent switching of the group used as the entire motion vector between the principal object group and background group can be suppressed. For this reason, when the difference between the numbers of vector detection regions of the principal object region and background region is small, an unnatural video picture can be prevented from being generated.

Third Embodiment

The third embodiment of the present invention will be described below. In the third embodiment, an entire motion vector is generated by combining a representative motion vector of a background group and that of a principal object group at a predetermined ratio.

Note that the third embodiment can adopt the arrangements of the image capturing apparatus 1 and motion vector detection unit 14 described in the first embodiment intact. Also, since the processes from the filter 33 to the motion vector calculation unit 31 in the motion vector detection unit 14 are the same as those described in the first embodiment, a description thereof will not be repeated.

Figure 13:
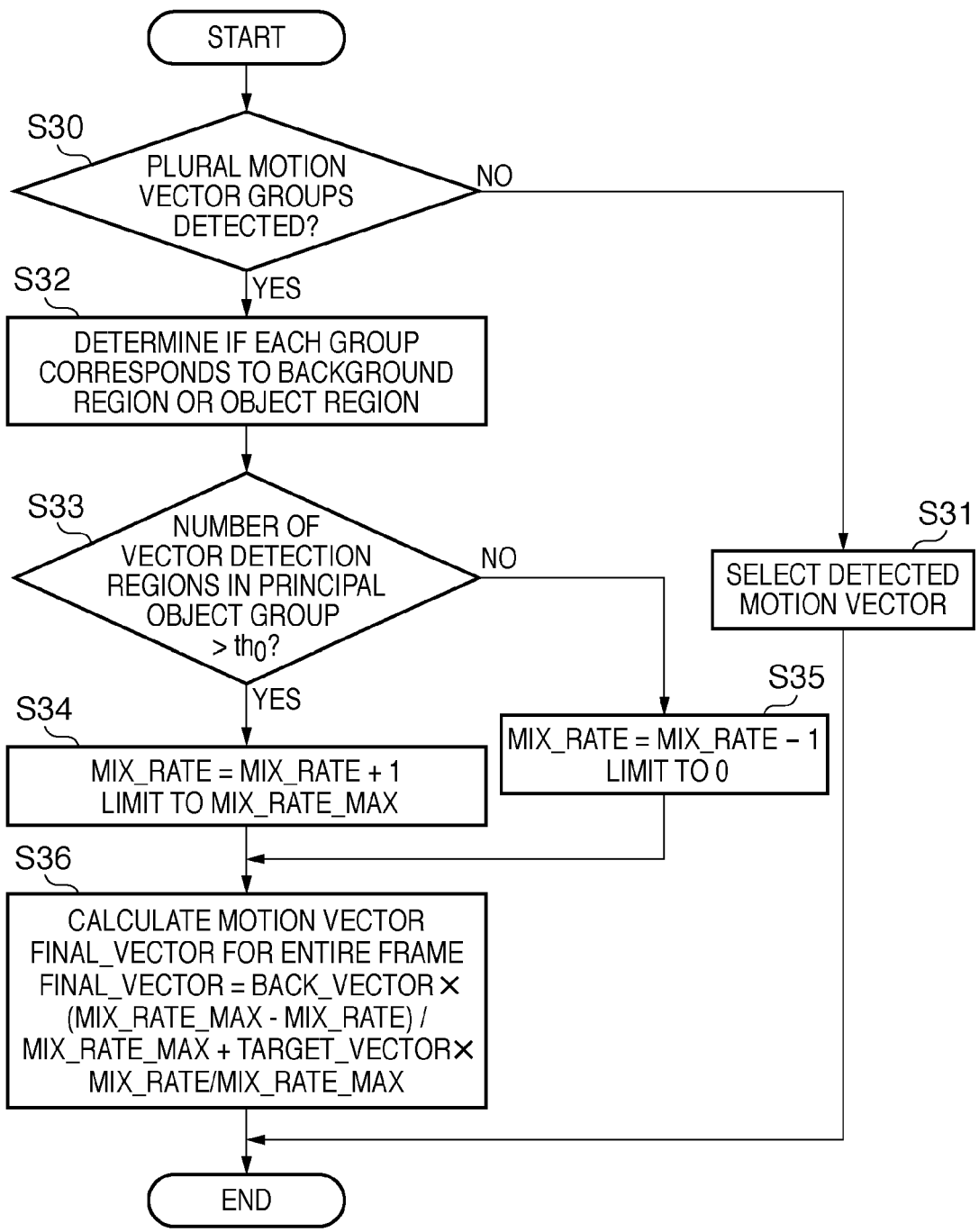
FIG. 13 is a flowchart showing an example of entire motion vector calculation processing according to the third embodiment of the present invention.

FIG. 13 is a flowchart showing an example of entire motion vector calculation processing according to the third embodiment. Respective processes in the flowchart shown in FIG. 13 are executed by a motion vector control unit 32 under the control of a system control unit 22.

In the flowchart shown in FIG. 13, the processes in steps S30 to S33 are the same as those in steps S10 to S13 in the flowchart shown in FIG. 7. That is, the motion vector control unit 32 determines in step S30 whether or not a motion vector classifying unit 30 detects a plurality of groups in the current image data, that is, in image data of the current field.

If it is determined in step S30 that the motion vector classifying unit 30 detects one group, the process advances to step S31, and the motion vector control unit 32 adopts the representative motion vector of the detected group as an entire motion vector. Then, the motion vector control unit 32 starts processing for the next field image (not shown).

On the other hand, if it is determined in step S30 that the motion vector classifying unit 30 detects a plurality of groups, the process advances to step S32. Then, the motion vector control unit 32 determines by the method described using FIGS. 8A to 6D if each of the groups detected by the motion vector classifying unit 30 is that defined by vector detection regions of a background region or that defined by those of a principal object region.

If the group defined by the principal object region is determined in step S32, the process advances to step S33. The motion vector control unit 32 determines in step S33 whether or not the number of vector detection regions which belong to the principal object group determined as the group defined by the principal object region in step S32 is larger than a threshold $th_0$.

If it is determined in step S33 that the number of vector detection regions which belong to the principal object group is larger than the threshold $th_0$, the process advances to step S34. In step S34, the motion vector control unit 32 adds, for example, "1" to a variable MIX_RATE used in step S36 to be described later to increment the variable MIX_RATE. However, when the variable MIX_RATE reaches an upper limit value MIX_RATE_MAX, the motion vector control unit 32 does not increment the variable MIX_RATE any more. The variable MIX_RATE is held in, for example, a register included in the motion vector control unit 32.

On the other hand, if it is determined in step S33 that the number of vector detection regions which belong to the principal object group is not larger than the threshold $th_0$, the process advances to step S35. In step S35, the motion vector control unit 32 subtracts, for example, "1" from the variable MIX_RATE to decrement the variable MIX_RATE. However, when the variable MIX_RATE reaches a lower limit value "0", the motion vector control unit 32 does not decrement the variable MIX_RATE any more.

Upon completion of the processing in step S34 or S35, the process advances to step S36. In step S36, the motion vector control unit 32 calculates an entire motion vector FINAL_VECTOR by:

$$\text{FINAL\_VECTOR} = \text{BACK\_VECTOR} \times (\text{MIX\_RATE\_MAX} - \text{MIX\_RATE}) / \text{MIX\_RATE\_MAX} + \text{TARGET\_VECTOR} \times \text{MIX\_RATE}/\text{MIX\_RATE\_MAX} \quad (4)$$

where the value BACK_VECTOR is a representative motion vector of the background group, and the value TARGET_VECTOR is that of the group of the principal object region.

After the entire motion vector is calculated using equation (4) in step S36, the motion vector control unit 32 starts processing for the next field image (not shown). The variable MIX_RATE is held, and is incremented or decremented in step S34 or S35 upon execution of the processing for the next field image.

In equation (4), the variable MIX_RATE indicates the ratio of motion vectors of the principal object region in the entire motion vector FINAL_VECTOR when the upper limit value MIX_RATE_MAX is 100%. Therefore, the term (MIX_RATE_MAX−MIX_RATE) in equation (4) yields a value indicating the ratio of motion vectors of the background region in the entire motion vector FINAL_VECTOR.

That is, in the third embodiment, upon switching a representative motion vector used as the entire motion vector between the principal object group and background group, the mixing ratio of motion vectors in the principal object region and background region is gradually changed. For example, when the difference between the numbers of vector detection regions of the principal object region and background region is small, a group used as the entire motion vector may be frequently switched between the principal object region and background region. In such case, the representative motion vectors of the principal object region and background regions are used at nearly equal ratios to generate an entire motion vector.

In this manner, the group used as the entire motion vector can be suppressed from being abruptly switched between the principal object group and background group, thus preventing generation of an unnatural video picture.

<Modification of Third Embodiment>

Figure 14:
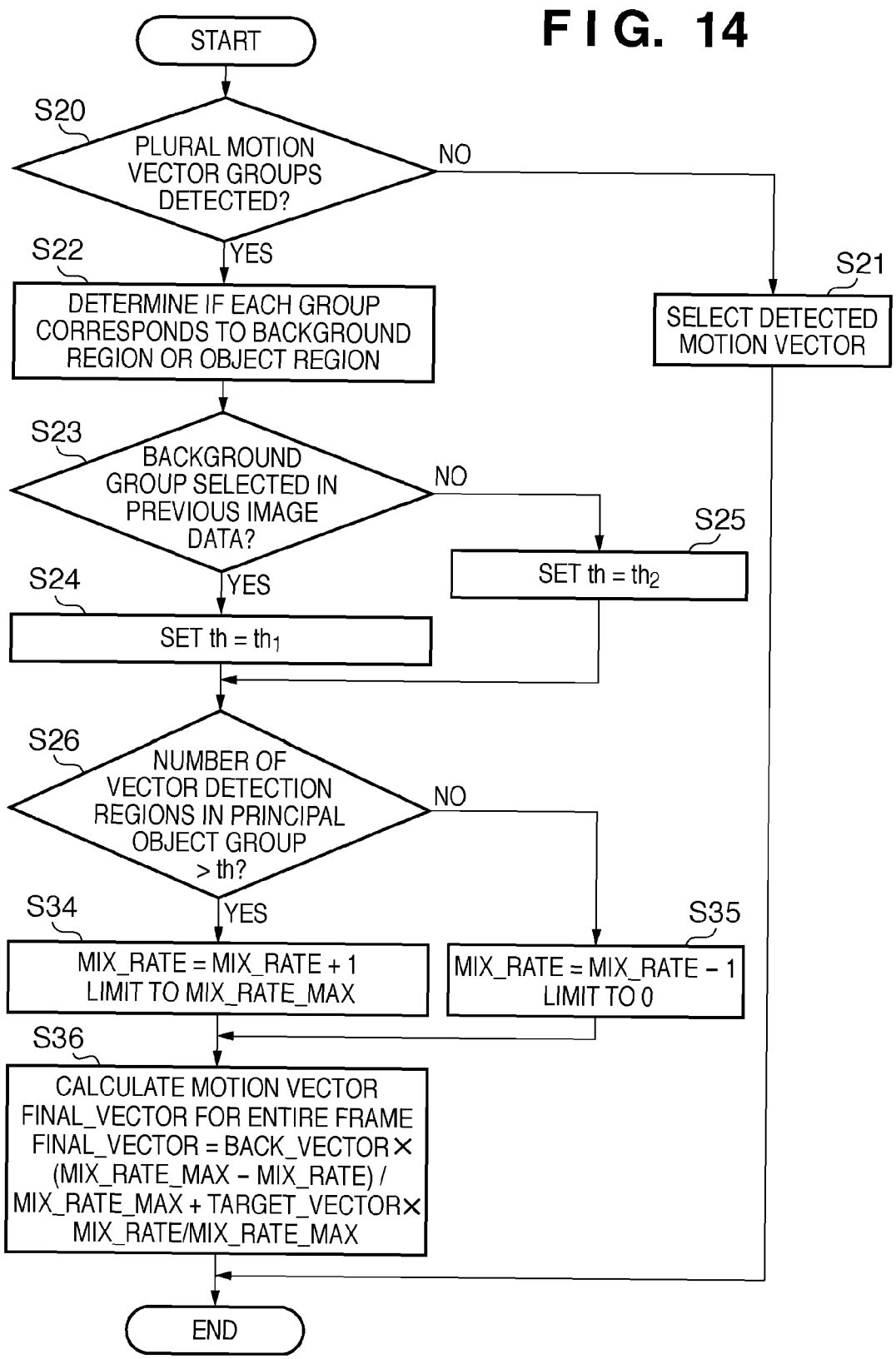
FIG. 14 is a flowchart showing an example of entire motion vector calculation processing according to a modification of the third embodiment of the present invention.

A modification of the third embodiment will be described below. In this modification, the processing according to the second embodiment described above is combined with the third embodiment. FIG. 14 is a flowchart showing an example of entire motion vector calculation processing according to the modification of the third embodiment. Respective processes in the flowchart shown in FIG. 14 are executed by the motion vector control unit 32 under the control of the system control unit 22. In the flowchart shown in FIG. 14, the same step numbers denote processes common to those in the flowcharts shown in FIGS. 12 and 13 above, and a detailed description thereof will not be repeated.

The motion vector control unit 32 determines in step S20 whether or not the motion vector classifying unit 30 detects a plurality of groups in the current image data. If it is determined that the motion vector classifying unit 30 detects one group, the process advances to step S21, and the motion vector control unit 32 adopts the representative motion vector of the detected group as an entire motion vector. Then, the motion vector control unit 32 starts processing for the next field image (not shown).

On the other hand, if it is determined in step S20 that the motion vector classifying unit 30 detects a plurality of groups, the process advances to step S22. Then, the motion vector control unit 32 determines by the method described using FIGS. 8A to 6D if each of the groups detected by the motion vector classifying unit 30 is that defined by vector detection regions of a background region or that defined by those of a principal object region.

Upon completion of the determination processing in step S22, the process advances to step S23. The motion vector control unit 32 determines in step S23 whether or not a background group of a plurality of groups detected by the motion vector classifying unit 30 was selected as a group used to calculate an entire motion vector in previous image data.

If it is determined in step S23 that the background group was selected, the process advances to step S24, and the motion vector control unit 32 sets a first value $th_1$ as a threshold th used in step S26 to be described later. On the other hand, if it is determined in step S23 that the background group was not selected, the process advances to step S25, and the motion vector control unit 32 sets a second value $th_2$ smaller than the first value $th_1$ as the threshold th used in step S26 to be described later.

The process advances to step S26. The motion vector control unit 32 determines in step S26 whether or not the number of vector detection regions which belong to the principal object group determined as the principal object region in step S22 is larger than the threshold th set in step S24 or S25.

If it is determined in step S26 that the number of vector detection regions which belong to the principal object group is larger than the threshold th, the process advances to step S34 to increment the variable MIX_RATE. However, when the variable MIX_RATE reaches the upper limit value MIX_RATE_MAX, the motion vector control unit 32 does not increment the variable MIX_RATE any more. On the other hand, if it is determined in step S26 that the number of vector detection regions which belongs to the principal object group is not larger than the threshold th, the process advances to step S35 to decrement the variable MIX_RATE. However, when the variable MIX_RATE reaches the lower limit value "0", the motion vector control unit 32 does not decrement the variable MIX_RATE any more.

Upon completion of the processing in step S34 or S35, the process advances to step S36. In step S36, the motion vector control unit 32 calculates an entire motion vector FINAL_VECTOR by equation (4) described above. After the entire motion vector is calculated, the motion vector control unit 32 starts processing for the next field image (not shown).

Fourth Embodiment

The fourth embodiment of the present invention will be described below. In the fourth embodiment, a representative motion vector used as an entire motion vector is selected by determination processing which combines the aforementioned determination processing according to the first and second embodiments, and determination processing as to whether or not a difference between representative motion vectors of a principal object region and background region is less than or equal to a predetermined value.

Figure 15:
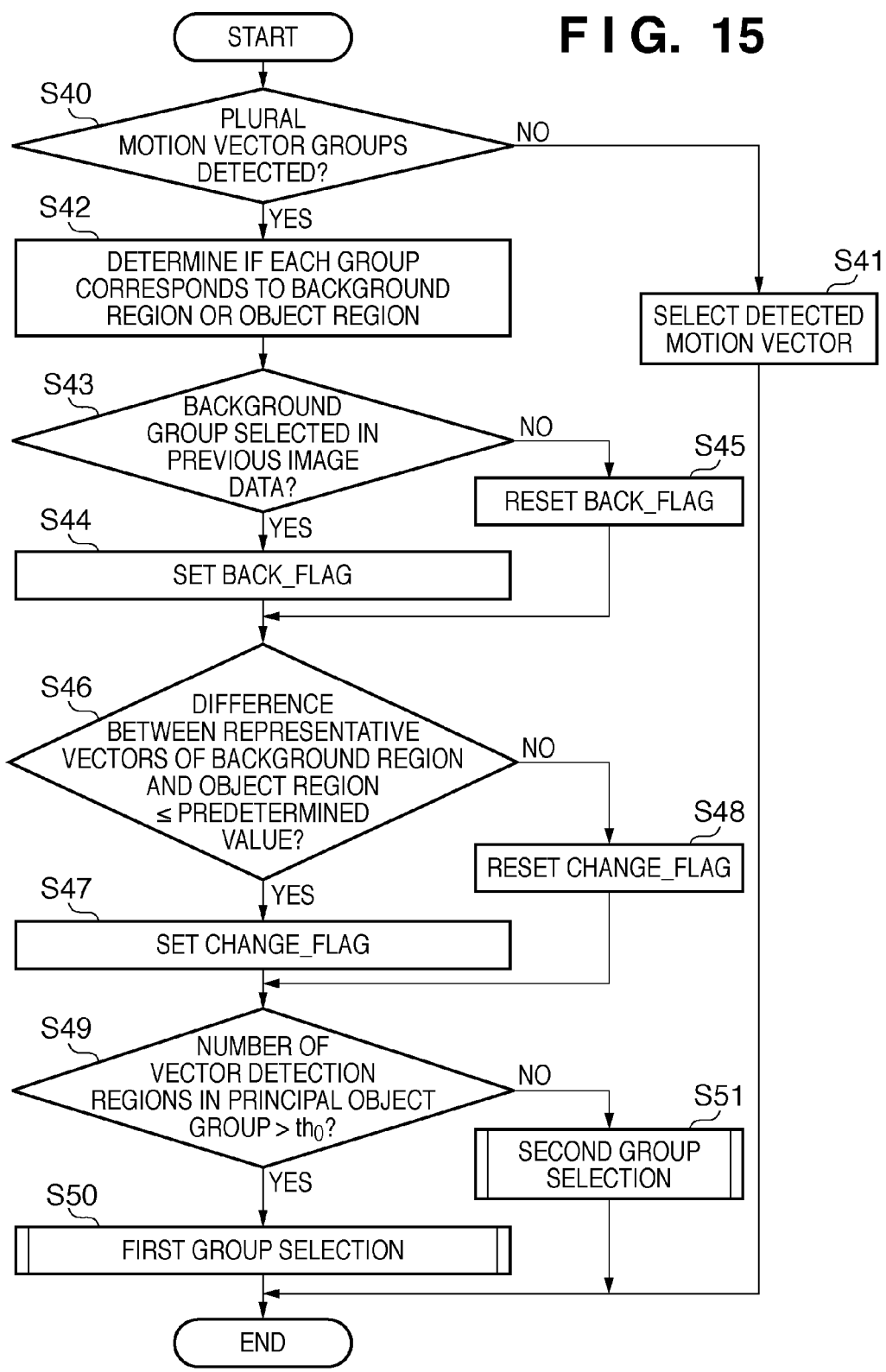
FIG. 15 is a flowchart showing an example of entire motion vector calculation processing according to the fourth embodiment of the present invention.

FIG. 15 is a flowchart showing an example of entire motion vector calculation processing according to the fourth embodiment. Respective processes in the flowchart shown in FIG. 15 are executed by a motion vector control unit 32 under the control of a system control unit 22.

In the flowchart shown in FIG. 15, processes in steps S40 to S43 are the same as those in steps S20 to S23 in the flowchart shown in FIG. 12. That is, the motion vector control unit 32 determines in step S40 whether or not a motion vector classifying unit 30 detects a plurality of groups in the current image data, that is, in image data of the current field. If it is determined that the motion vector classifying unit 30 detects one group, the process advances to step S41, and the motion vector control unit 32 adopts the representative motion vector of the detected group as a motion vector for the entire frame, that is, the entire image. Then, the motion vector control unit 32 starts processing for the next field image (not shown).

On the other hand, if it is determined in step S40 that the motion vector classifying unit 30 detects a plurality of groups, the process advances to step S42. Then, the motion vector control unit 32 determines by the method described using FIGS. 8A to 6D if each of the groups detected by the motion vector classifying unit 30 is that defined by vector detection regions of a background region or that defined by those of a principal object region.

Upon completion of the determination processing in step S42, the process advances to step S43. The motion vector control unit 32 determines in step S43 whether or not a background group of a plurality of groups detected by the motion vector classifying unit 30 was selected as a group used to calculate an entire motion vector in previous image data, for example, image data one field before. If it was not determined in the previous image data that the motion vector classifying unit 30 detected a plurality of groups, it is deemed that the background group was selected as a group used to calculate an entire motion vector.

If it is determined in step S43 that the background group was selected, the process advances to step S44 to set a flag BACK_FLAG. On the other hand, if it is determined in step S43 that the background group was not selected, that is, the principal object group was selected, the process advances to step S45 to reset the flag BACK_FLAG. The flag BACK_FLAG is held in, for example, a register included in the motion vector control unit 32.

After the flag BACK_FLAG is set in step S44 or S45, the process advances to step S46. In step S46, the motion vector control unit 32 calculates the difference between a representative motion vector of the background region and that of the principal object region. Then, the motion vector control unit 32 determines whether or not this difference is less than or equal to a predetermined value. In other words, this determination processing in step S46 is to determine whether or not the moving speed of the principal object on the frame is equal to or lower than a predetermined speed.

If it is determined in step S46 that the difference between the representative motion vectors of the background region and principal object region is less than or equal to the predetermined value, the process advances to step S47 to set a flag CHANGE_FLAG. This is the case when the moving speed of the principal object on the frame is lower than the predetermined speed. The flag CHANGE_FLAG is held in, for example, a register included in the motion vector control unit 32.

On the other hand, if it is determined in step S46 that the difference between the representative motion vectors of the background region and principal object region is larger than the predetermined value, the process advances to step S48 to reset the flag CHANGE_FLAG. This is the case when the moving speed of the principal object on the frame is higher than the predetermined speed.

After the flag CHANGE_FLAG is set in step S47 or S48, the process advances to step S49. The motion vector control unit 32 determines in step S49 whether or not the number of vector detection regions which belong to the principal object group determined as the principal object region in step S42 above is larger than a predetermined threshold $th_0$.

If it is determined in step S49 that the number of vector detection regions which belong to the principal object group is larger than the threshold $th_0$, the process advances to step S50. In step S50, the motion vector control unit 32 selects a representative motion vector used as an entire motion vector by first group selection processing to be described later.

On the other hand, if it is determined in step S49 that the number of vector detection regions which belong to the principal object group is not larger than the threshold $th_0$, the process advances to step S51. In step S51, the motion vector control unit 32 selects a representative motion vector used as an entire motion vector by second group selection processing to be described later.

After the representative motion vector used as the entire motion vector is selected in step S50 or S51, the motion vector control unit 32 starts processing for the next field image (not shown).

Figure 16:
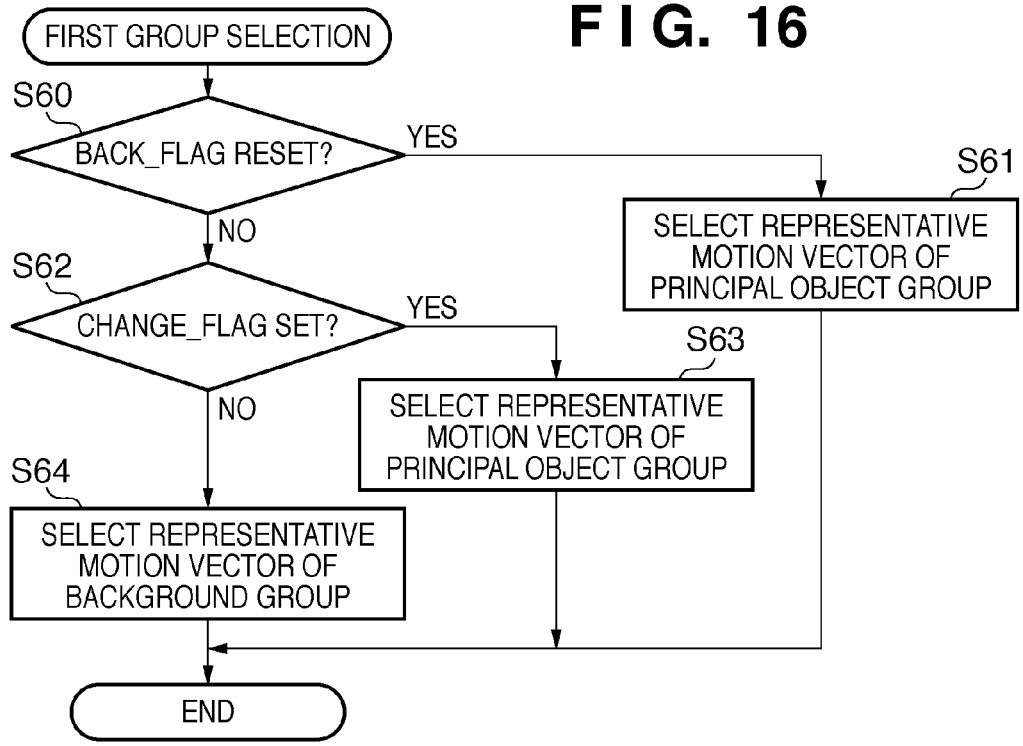
FIG. 16 is a flowchart showing an example of first group selection processing.

FIG. 16 is a flowchart showing an example of the first group selection processing in step S50 described above. The motion vector control unit 32 determines in step S60 whether or not the flag BACK_FLAG is reset. That is, the motion vector control unit 32 determines in step S60 whether or not the representative motion vector of the principal object group was selected as the entire motion vector in the previous image data. If it is determined that the flag BACK_FLAG is reset, the process advances to step S61. This is the case when the representative motion vector of the principal object group was selected as the entire motion vector in the previous image data. In step S61, the motion vector control unit 32 adopts the representative motion vector of the principal object group as an entire motion vector.

On the other hand, if it is determined in step S60 that the flag BACK_FLAG is not reset, the process advances to step S62. This is the case when the representative motion vector of the background region was selected as the entire motion vector in the previous image data. The motion vector control unit 32 determines in step S62 whether or not the flag CHANGE_FLAG is set. That is, the motion vector control unit 32 determines in step S62 whether or not the moving speed of the principal object on the frame is equal to or lower than the predetermined speed.

If it is determined in step S62 that the flag CHANGE_FLAG is set, the process advances to step S63. This is the case when the moving speed of the principal object on the frame is equal to or lower than the predetermined speed. In step S63, the motion vector control unit 32 adopts the representative motion vector of the principal object group as an entire motion vector.

On the other hand, if it is determined in step S62 that the flag CHANGE_FLAG is not set, the process advances to step S64. This is the case when the moving speed of the principal object on the frame is higher than the predetermined speed. In step S64, the motion vector control unit 32 adopts the representative motion vector of the background group as an entire motion vector.

After the representative motion vector used as the entire motion vector is decided in step S61, S63, or S64, the process exits the flowchart shown in FIG. 16, and returns to that shown in FIG. 15.

Figure 17:
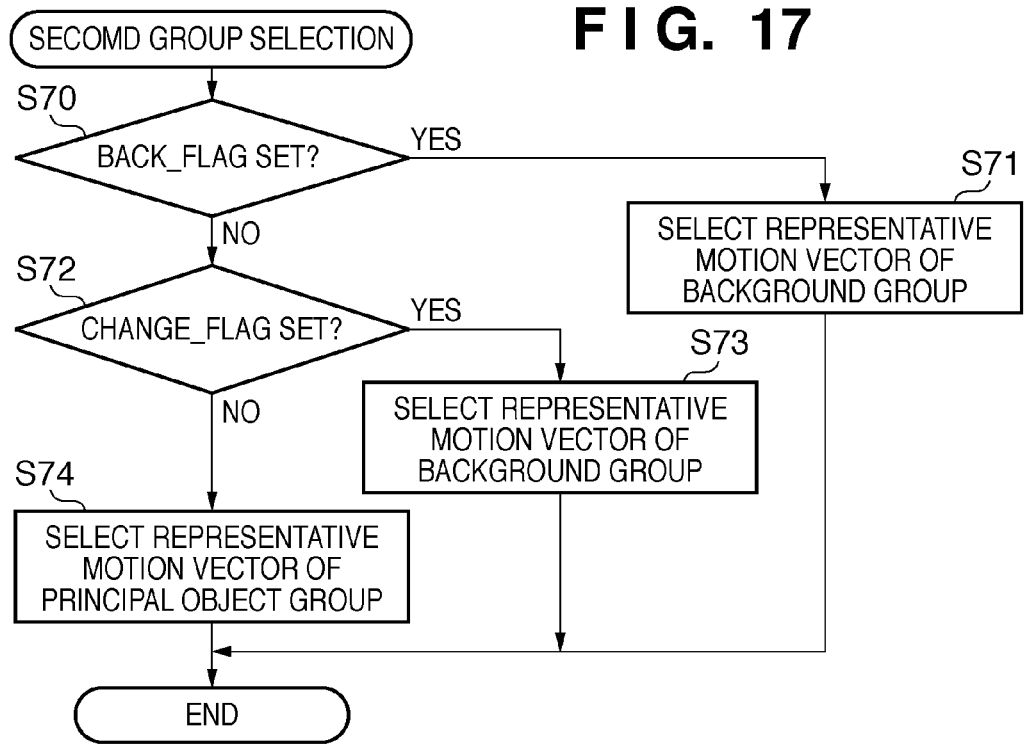
FIG. 17 is a flowchart showing an example of second group selection processing.

FIG. 17 is a flowchart showing an example of the second group selection processing in step S51 described above. The motion vector control unit 32 determines in step S70 whether or not the flag BACK_FLAG is set. That is, the motion vector control unit 32 determines in step S70 whether or not the representative motion vector of the background group was selected as the entire motion vector in the previous image data. If it is determined that the flag BACK_FLAG is set, the process advances to step S71. This is the case when the representative motion vector of the background group was selected as the entire motion vector in the previous image data. In step S71, the motion vector control unit 32 adopts the representative motion vector of the background group as an entire motion vector.

On the other hand, if it is determined in step S70 that the flag BACK_FLAG is not set, the process advances to step S72. This is the case when the representative motion vector of the principal object region was selected as the entire motion vector in the previous image data. The motion vector control unit 32 determines in step S72 whether or not the flag CHANGE_FLAG is set. That is, the motion vector control unit 32 determines in step S72 whether or not the moving speed of the principal object on the frame is equal to or lower than the predetermined speed.

If it is determined in step S72 that the flag CHANGE_FLAG is set, the process advances to step S73. This is the case when the moving speed of the principal object on the frame is equal to or lower than the predetermined speed. In step S73, the motion vector control unit 32 adopts the representative motion vector of the background group as an entire motion vector.

On the other hand, if it is determined in step S72 that the flag CHANGE_FLAG is not set, the process advances to step S74. This is the case when the moving speed of the principal object on the frame is higher than the predetermined speed. In step S74, the motion vector control unit 32 adopts the representative motion vector of the principal object group as an entire motion vector.

After the representative motion vector used as the entire motion vector is decided in step S71, S73, or S74, the process exits the flowchart shown in FIG. 17, and returns to that shown in FIG. 15.

The entire motion vector calculation processing based on the flowcharts shown in FIGS. 15 to 17 is summarized as follows.

When the number of vector detection regions which belong to the principal object group is larger than the threshold $th_0$, the entire motion vector is decided as follows.

(1) When the representative motion vector of the principal object group was selected as the entire motion vector in the previous image data, the motion vector control unit 32 adopts the representative motion vector of the principal object group as the entire motion vector irrespective of the moving speed of the principal object on the frame.

(2) When the representative motion vector of the background group was selected as the entire motion vector in the previous image data, if the moving speed of the principal object is higher than the predetermined speed, the motion vector control unit 32 adopts the representative motion vector of the background group as the entire motion vector. On the other hand, if the moving speed of the principal object is lower than the predetermined speed, the motion vector control unit 32 adopts the representative motion vector of the background group as the entire motion vector.

When the number of vector detection regions which belong to the principal object group is less than or equal to the threshold $th_0$, the entire motion vector is decided as follows.

(1) When the representative motion vector of the principal object group was selected as the entire motion vector in the previous image data, if the moving speed of the principal object is higher than the predetermined speed, the motion vector control unit 32 adopts the representative motion vector of the principal object group as the entire motion vector. On the other hand, if the moving speed of the principal object is lower than the predetermined speed, the motion vector control unit 32 adopts the representative motion vector of the background group as the entire motion vector.

(2) When the representative motion vector of the background group was selected as the entire motion vector in the previous image data, the motion vector control unit 32 adopts the representative motion vector of the background group as the entire motion vector irrespective of the moving speed of the principal object on the frame.

With the aforementioned processing, the processing for switching the representative motion vector used as the entire motion vector between those of the principal object group and background group is executed when the motion of the principal object is small. Thus, when the representative motion vector used as the entire motion vector is switched between the principal object group and background group, a phenomenon that a region stabilized by shake control so far begins to abruptly move can be prevented.

<Modification of Fourth Embodiment>

A modification of the aforementioned fourth embodiment will be described below. In this modification, the processes in steps S24 and S25 in the flowchart shown in FIG. 12 according to the second embodiment described above are added to the flowchart shown in FIG. 15 according to the fourth embodiment described above, and the process in step S49 is replaced by that in step S26. That is, in this modification, processing for setting a threshold th depending on as to whether or not the representative motion vector of the background group was selected as the entire motion vector in the previous image data is additionally executed in the aforementioned fourth embodiment.

Figure 18:
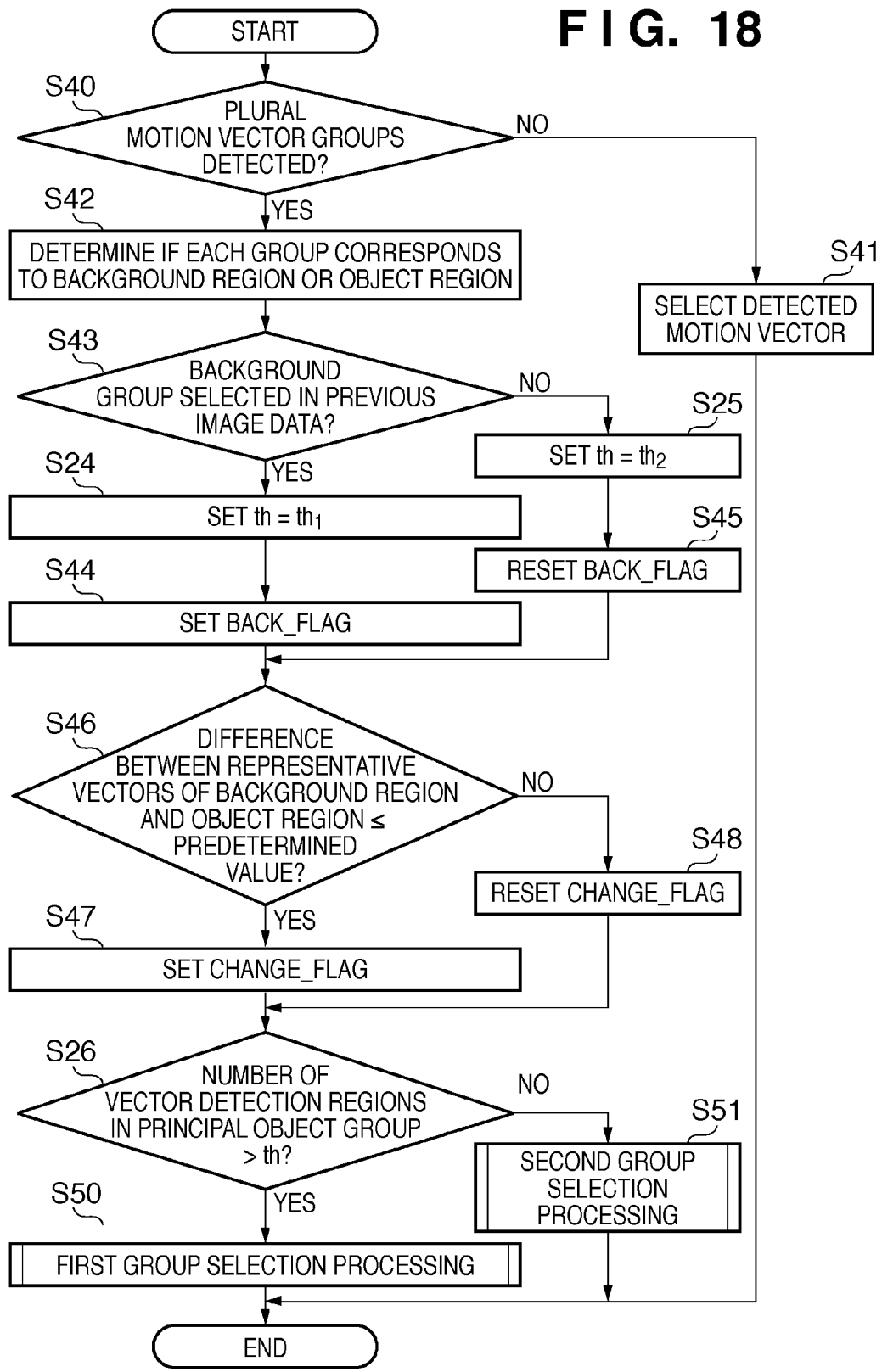
FIG. 18 is a flowchart showing an example of entire motion vector calculation processing according to a modification of the fourth embodiment of the present invention.
Figure 19:
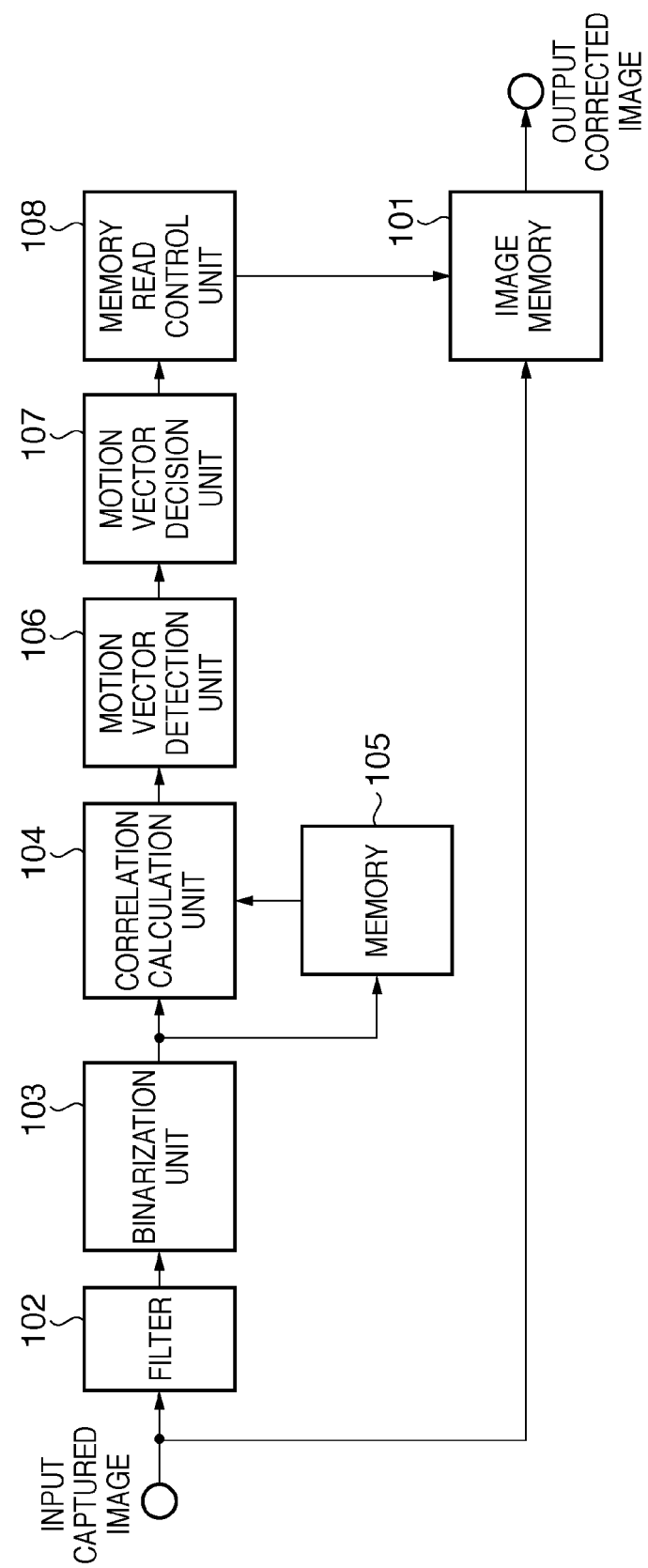
FIG. 19 is a block diagram showing an example of the arrangement for preventing any blur by a conventional motion vector detection method.
Figure 20A:
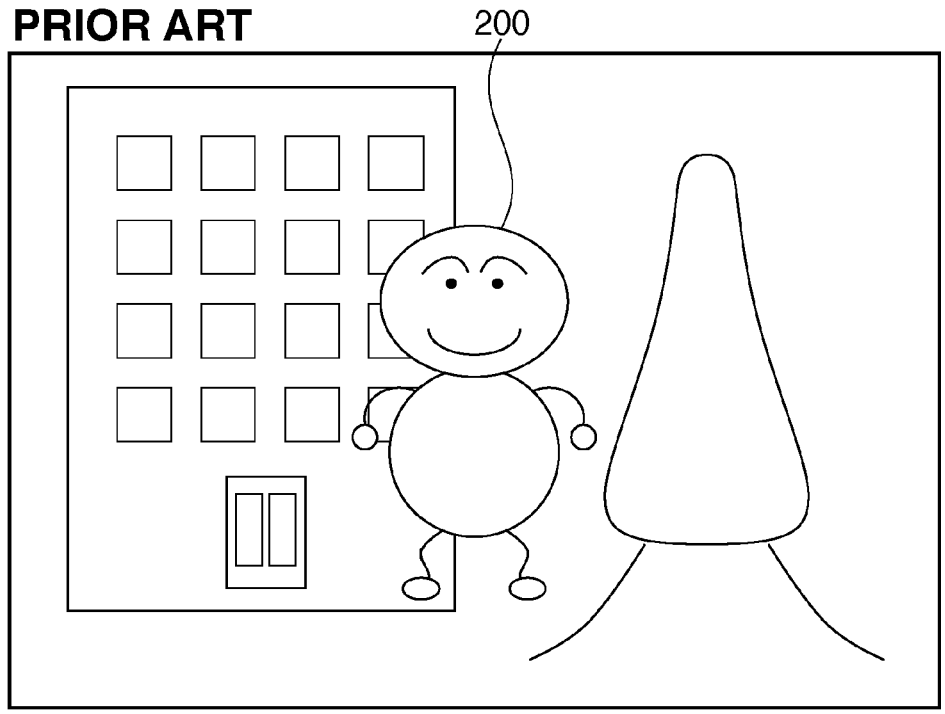
FIGS. 20A and 20B are views for explaining conventional problems.
Figure 20B:
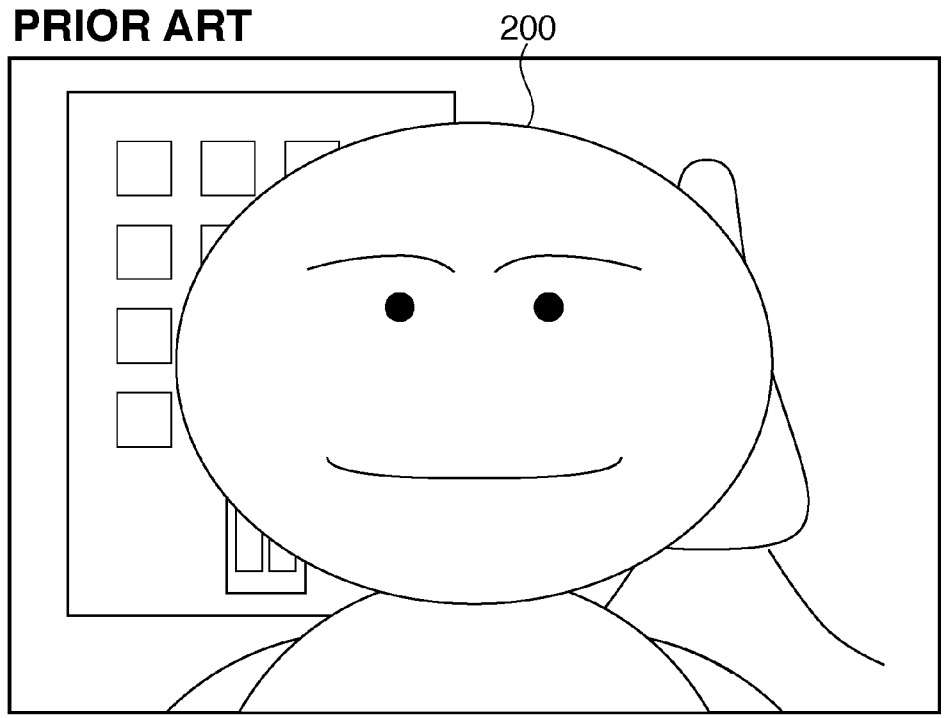

FIG. 18 is a flowchart showing an example of entire motion vector calculation processing according to this modification. Respective processes in the flowchart shown in FIG. 18 are executed by the motion vector control unit 32 under the control of the system control unit 22. Note that the same step numbers in the flowchart shown in FIG. 18 denote the processes common to those in the flowchart shown in FIG. 15, and a detailed description thereof will not be repeated.

In the flowchart shown in FIG. 18, the motion vector control unit 32 determines in step S40 if the motion vector classifying unit 30 detects a plurality of groups in the current image data. If it is determined that the motion vector classifying unit 30 detects one group, the process advances to step S41, and the motion vector control unit 32 adopts the representative motion vector of the detected group as an entire motion vector. Then, the motion vector control unit 32 starts processing for the next field image (not shown).

On the other hand, if it is determined in step S40 that the motion vector classifying unit 30 detects a plurality of groups, the process advances to step S42. Then, the motion vector control unit 32 determines by the method described using FIGS. 8A to 6D if each of the groups detected by the motion vector classifying unit 30 is that defined by vector detection regions of a background region or that defined by those of a principal object region.

Upon completion of the determination processing in step S42, the process advances to step S43. The motion vector control unit 32 determines in step S43 whether or not a representative motion vector of a background group of a plurality of groups detected by the motion vector classifying unit 30 was selected as an entire motion vector in previous image data, for example, image data one field before.

If it is determined in step S43 that the background group was selected, the process advances to step S24 to set a first value $th_1$ as a threshold th used in step S26 to be described later. The process then advances to step S44 to set the flag BACK_FLAG.

On the other hand, if it is determined in step S43 that the background group was not selected, the process advances to step S25 to set a second value $th_2$ smaller than the first value $th_1$ as the threshold th. Then, the process advances to step S45 to reset the flag BACK_FLAG.

After the flag BACK_FLAG is set in step S44 or S45, the process advances to step S46. In step S46, the motion vector control unit 32 calculates the difference between representative motion vectors of the background region and principal object region. Then, the motion vector control unit 32 determines whether or not this difference is less than or equal to a predetermined value.

If it is determined in step S46 that the difference between the representative motion vectors of the background region and principal object region is less than or equal to the predetermined value, the process advances to step S47 to set the flag CHANGE_FLAG. On the other hand, if it is determined in step S46 that the difference between the representative motion vectors of the background region and principal object region is larger than the predetermined value, the process advances to step S48 to reset the flag CHANGE_FLAG.

After the flag CHANGE_FLAG is set in step S47 or S48, the process advances to step S26. The motion vector control unit 32 determines in step S26 whether or not the number of vector detection regions which belong to the principal object group determined as the principal object region in step S42 above is larger than the threshold th set in step S24 or S25 above.

If it is determined in step S26 that the number of vector detection regions which belong to the principal object group is larger than the threshold th, the process advances to step S50. In step S50, the motion vector control unit 32 selects a representative motion vector used as an entire motion vector by the first group selection processing described using FIG. 16.

On the other hand, if it is determined in step S26 that the number of vector detection regions which belong to the principal object group is not larger than the threshold th, the process advances to step S51. In step S51, the motion vector control unit 32 selects a representative motion vector used as an entire motion vector by the second group selection processing described using FIG. 17.

After the representative motion vector used as the entire motion vector is selected in step S50 or S51, the motion vector control unit 32 starts processing for the next field image (not shown).

As described above, according to the present invention, when the occupation ratio of the principal object in the frame is relatively large, the vector detection result of the principal object region is positively used to calculate motion vector values with high precision. Also, when the size of the principal object has changed, a region used to calculate the entire vector can be switched smoothly.

Other Embodiments

In the above description, the present invention is applied to the image capturing apparatus such as a digital video camera. However, the present invention is not limited to such specific example. For example, the present invention can be applied to a personal computer including a video camera or a mobile phone terminal that allows to capture a motion image. Furthermore, the present invention can also be applied to processing for image data recorded on a recording medium in addition to processing for image data which are output in real time by image capturing. In this case, the processing according to the present invention can be applied to image data which were captured by the image capturing apparatus 1 and were recorded on the recording medium 18. Also, the processing according to the present invention may be applied to image data recorded on, for example, a hard disk of a personal computer by means of software on the personal computer.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-105608, filed on Apr. 23, 2009, which is hereby incorporated by reference herein its entirety.

What is claimed is:

1. A motion vector detection apparatus for detecting a motion vector for an entire image, comprising:
   a motion vector detection unit configured to detect motion vectors for respective blocks obtained by dividing an image into the respective blocks each having a predetermined size;
   a classifying unit configured to classify the respective blocks into groups based on the motion vectors detected by said motion vector detection unit;
   a representative motion vector calculation unit configured to calculate representative motion vectors which represent the motion vectors of the blocks that belong to the groups classified by said classifying unit;
   a first determination unit configured to determine whether each of the groups classified by said classifying unit corresponds to a first group or a second group which moves relative to the first group; and
   a selection unit configured to, when the number of blocks included in the second group exceeds a threshold, select the representative motion vector corresponding to the second group as the motion vector for the entire image, and to, when the number of blocks included in the second group does not exceed the threshold, select the representative motion vector corresponding to the first group as the motion vector for the entire image.

2. The apparatus according to claim 1, further comprising a second determination unit configured to determine whether or not the representative motion vector corresponding to the second group is selected as the motion vector for a previous entire image which was obtained earlier than the entire image,
   wherein said selection unit changes the threshold depending on whether or not said second determination unit determines that the representative motion vector corresponding to the second group is selected as the motion vector for the previous entire image, and selects the representative motion vector used as the motion vector for the entire image.

3. The apparatus according to claim 2, wherein the threshold used when it is determined that the representative motion vector corresponding to the second group is selected as the motion vector for the previous entire image is smaller than the threshold used when it is not determined that the representative motion vector corresponding to the second group is selected as the motion vector for the previous entire image.

4. The apparatus according to claim 1, further comprising:
a second determination unit configured to determine whether or not the representative motion vector corresponding to the second group was selected as the motion vector for the entire image in an image temporally immediately before the image; and
a difference calculation unit configured to calculate a difference between the representative motion vector corresponding to the first group and the representative motion vector corresponding to the second group,
wherein said selection unit selects the representative motion vector used as the motion vector for the entire image from the representative motion vector corresponding to the first group and the representative motion vector corresponding to the second group further using the determination result of said second determination unit and the difference calculated by said difference calculation unit.

5. The apparatus according to claim 4, wherein when the number of blocks included in the second group determined by said first determination unit exceeds the threshold, and said second determination unit determines that the representative motion vector corresponding to the second group was selected as the motion vector for the entire image, said selection unit selects the representative motion vector corresponding to the second group as the motion vector for the entire image.

6. The apparatus according to claim 4, wherein when the number of blocks included in the second group determined by said first determination unit exceeds the threshold, and said second determination unit determines that the representative motion vector corresponding to the first group was selected as the motion vector for the entire image, said selection unit selects the representative motion vector corresponding to the first group as the motion vector for the entire image when the difference is larger than a predetermined value.

7. The apparatus according to claim 4, wherein when the number of blocks included in the second group determined by said first determination unit exceeds the threshold, and said second determination unit determines that the representative motion vector corresponding to the first group was selected as the motion vector for the entire image, said selection unit selects the representative motion vector corresponding to the second group as the motion vector for the entire image when the difference is not more than the predetermined value.

8. The apparatus according to claim 4, wherein when the number of blocks included in the second group determined by said first determination unit is not more than the threshold, and said second determination unit determines that the representative motion vector corresponding to the first group was selected as the motion vector for the entire image, said selection unit selects the representative motion vector corresponding to the first group as the motion vector for the entire image.

9. The apparatus according to claim 4, wherein when the number of blocks included in the second group determined by said first determination unit is not more than the threshold, and said second determination unit determines that the representative motion vector corresponding to the second group was selected as the motion vector for the entire image, said selection unit selects the representative motion vector corresponding to the second group as the motion vector for the entire image when the difference is larger than a predetermined value.

10. The apparatus according to claim 4, wherein when the number of blocks included in the second group determined by said first determination unit is not more than the threshold, and said second determination unit determines that the representative motion vector corresponding to the second group was selected as the motion vector for the entire image, said selection unit selects the representative motion vector corresponding to the first group as the motion vector for the entire image when the difference is not more than the predetermined value.

11. The apparatus according to claim 5, wherein said selection unit changes the threshold depending on whether or not said second determination unit determines that the representative motion vector corresponding to the second group was selected as the motion vector for the entire image, and selects the representative motion vector used as the motion vector for the entire image.

12. The apparatus according to claim 11, wherein the threshold used when it is determined that the representative motion vector corresponding to the second group was selected as the motion vector for the entire image is smaller than the threshold used when it is not determined that the representative motion vector corresponding to the second group was selected as the motion vector for the entire image.

13. The apparatus according to claim 1, wherein said selection unit combines, at a predetermined ratio, the representative motion vector corresponding to the first group and the representative motion vector corresponding to the second group based on the number of blocks included in the second group determined by said first determination unit, and uses the combined representative motion vector as the motion vector for the entire image.

14. The apparatus according to claim 13, wherein when the number of blocks included in the second group determined by said first determination unit exceeds the threshold, said selection unit increases the predetermined ratio for the representative motion vector corresponding to the second group.

15. The apparatus according to claim 1, wherein said classifying unit classifies the blocks based on frequency distributions of magnitudes of the motion vectors.

16. The apparatus according to claim 1, wherein said first determination unit calculates values of statistic measure of coordinates of the blocks which belong to the groups to which the blocks are classified by said classifying unit, and determines the group having a larger value of statistic measure as the first group of the groups, and the group having a smaller value of statistic measure as the second group.

17. The apparatus according to claim 16, wherein when said classifying unit classifies the blocks into at least three groups, said first determination unit determines the group having a largest value of statistic measure as the first group, and determines the group having a largest number of classified blocks of the plurality of groups which are not the first group as the second group, and the group which is not the first and second groups as a third group.

18. The apparatus according to claim 1, further comprising a face detection unit configured to detect a face from the image,
wherein said first determination unit compares the numbers of blocks including a region of the face detected by said face detection unit between the groups to which the blocks are classified by said classifying unit, and determines the group including a larger number of blocks as the second group and the group including a smaller number of blocks as the first group.

19. The apparatus according to claim 18, wherein when said classifying unit classifies the blocks into at least three groups, said first determination unit further determines the group including a smallest number of blocks including the region of the face as the first group, and determines the group including a largest number of classified blocks of the plurality of groups which are not the first group as the second group, and the group which is not the first and second groups as a third group.

20. A motion vector detection method for detecting a motion vector for an entire image, which is used to correct any blur in images to be continuously captured, comprising:
- a motion vector detection step of detecting motion vectors for respective blocks obtained by dividing an image into the respective blocks each having a predetermined size;
- a classifying step of classifying the respective blocks into groups based on the motion vectors detected in the motion vector detection step;
- a representative motion vector calculation step of calculating representative motion vectors which represent the motion vectors of the blocks that belong to the groups classified in the classifying step;
- a first determination step of determining whether each of the groups classified in the classifying step corresponds to a first group or a second group which moves relative to the first group; and
- a selection step of selecting, when the number of blocks included in a the second group exceeds a threshold, the representative motion vector corresponding to the second group as the motion vector for the entire image, and selecting, when the number of blocks included in the second group does not exceed the threshold, the representative motion vector corresponding to the first group as the motion vector for the entire image.

21. An image capturing apparatus comprising:
- an image capturing optical system;
- an image capturing unit configured to capture incoming light via said image capturing optical system and outputting the captured incoming light as a captured image signal;
- a signal processing unit configured to apply predetermined signal processing to the captured image signal and output the processed signal as a captured image;
- a motion vector detection apparatus of claim 1 which calculates a motion vector for an entire image of the captured image based on the captured image output from said signal processing unit; and
- a blur correction unit configured to correct a blur in the captured image output from said signal processing unit using the motion vector for the entire image calculated by said motion vector detection apparatus.

22. A non-transitory computer-readable recording medium storing a program for making a computer function as respective unit of a motion vector detection apparatus of claim 1.

* * * * *